United States Patent
Tang et al.

(10) Patent No.: US 10,243,833 B2
(45) Date of Patent: Mar. 26, 2019

(54) FLOW TABLE MANAGEMENT METHOD, AND RELATED DEVICE AND SYSTEM

(71) Applicant: HUAWEI TECHNOLOGIES CO., LTD., Shenzhen, Guangdong (CN)

(72) Inventors: Pengcheng Tang, Shanghai (CN); Wei Zhou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 160 days.

(21) Appl. No.: 15/360,129

(22) Filed: Nov. 23, 2016

(65) Prior Publication Data
US 2017/0078184 A1    Mar. 16, 2017

Related U.S. Application Data

(63) Continuation of application No. PCT/CN2014/078551, filed on May 27, 2014.

(51) Int. Cl.
*H04L 12/721* (2013.01)
*H04L 12/751* (2013.01)
*H04L 12/715* (2013.01)

(52) U.S. Cl.
CPC .............. *H04L 45/02* (2013.01); *H04L 45/38* (2013.01); *H04L 45/64* (2013.01)

(58) Field of Classification Search
None
See application file for complete search history.

(56) References Cited

U.S. PATENT DOCUMENTS

2012/0099591 A1    4/2012    Kotha et al.
2013/0124707 A1*   5/2013    Ananthapadmanabha ............
                                                        H04L 45/7457
                                                        709/223
(Continued)

FOREIGN PATENT DOCUMENTS

CN    103067245    4/2013
CN    103401784    11/2013
(Continued)

OTHER PUBLICATIONS

International Search Report, dated Feb. 26, 2015, in International Application No. PCT/CN2014/078551 (4 pp.).
(Continued)

*Primary Examiner* — Ayanah S George
(74) *Attorney, Agent, or Firm* — Staas & Halsey LLP

(57) ABSTRACT

A flow table management method, devices, and systems. The flow table management method includes: generating, by a software defined network controller, a first flow table entry, where a first field set in the first flow table entry carries an index of an actual value in the first field set, and the first field set includes N fields; and sending, by the software defined network controller, an OpenFlow protocol message to an OpenFlow switch, where the OpenFlow protocol message carries the first flow table entry. The technical solution in the embodiments of the present invention helps reduce a data volume of flow table entries delivered by an SDN controller to an OpenFlow switch, thereby reducing overheads of a control channel to reduce a congestion risk of the control channel, and reducing occupied network processing resources of the SDN controller and the OpenFlow switch to deliver the flow table entries.

18 Claims, 16 Drawing Sheets

(56) References Cited

U.S. PATENT DOCUMENTS

2013/0163475 A1     6/2013   Beliveau et al.
2013/0294249 A1    11/2013   Lin et al.
2014/0241356 A1*    8/2014   Zhang .................... H04L 45/38
                                                                                           370/392

FOREIGN PATENT DOCUMENTS

| CN | 103703726 | 4/2014 |
| EP | 2 615 781 A1 | 7/2013 |
| JP | 2013-225856 | 10/2013 |
| KR | 10-2013-0050356 | 5/2013 |

OTHER PUBLICATIONS

Jun Zheng et al.; "Ad Hoc Networks", 4$^{th}$ International ICST Conference, ADHOCNETS 2012; Paris, France; Oct. 2012; XP-002769601, 3 pages.

Extended European Search Report dated Oct. 5, 2017 in corresponding European Patent Application No. 14893407.8, 7 pages.

International Search Report dated Feb. 26, 2015 in corresponding International Patent Application No. PCT/CN2014/078551, 4 pages.

Korean Office Action dated Apr. 16, 2018, in corresponding Korean Patent Application No. 10-2016-7036135, 11 pgs.

\* cited by examiner

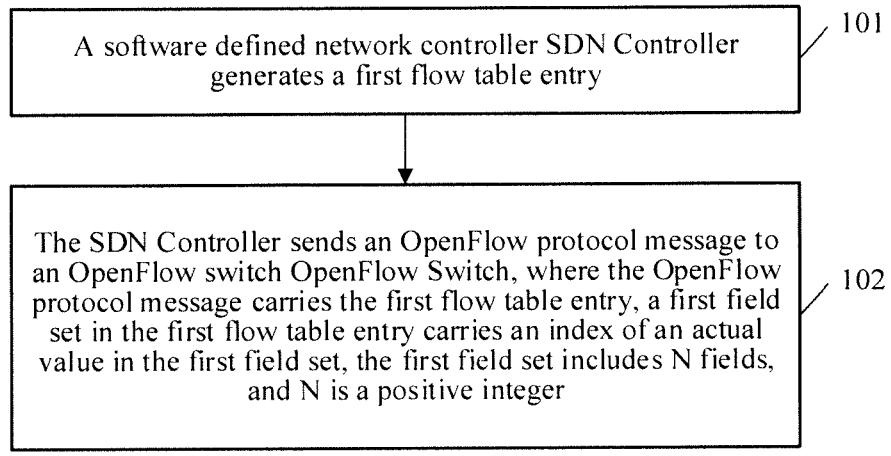
FIG. 1-a
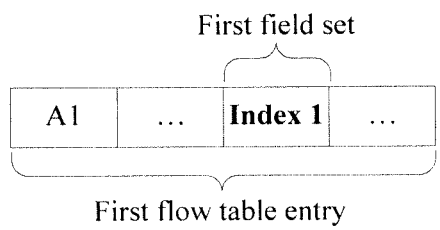
FIG. 1-b
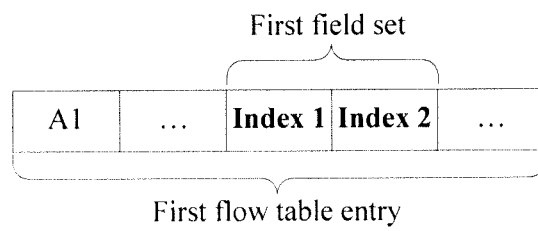
FIG. 1-c
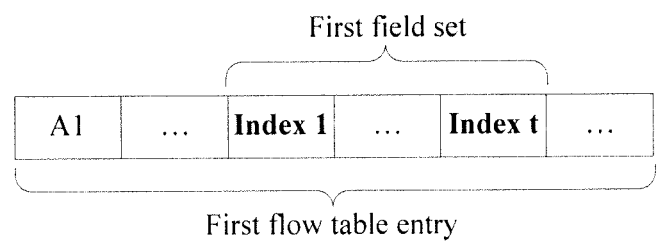
FIG. 1-d

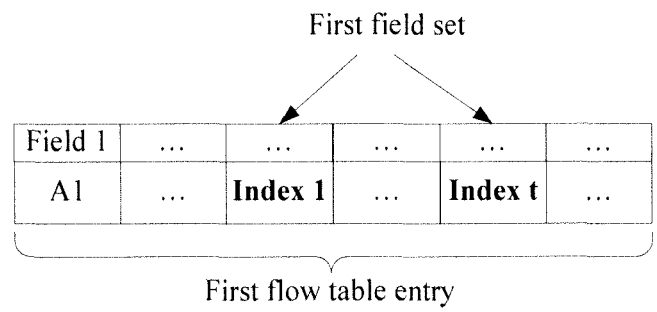
FIG. 1-e
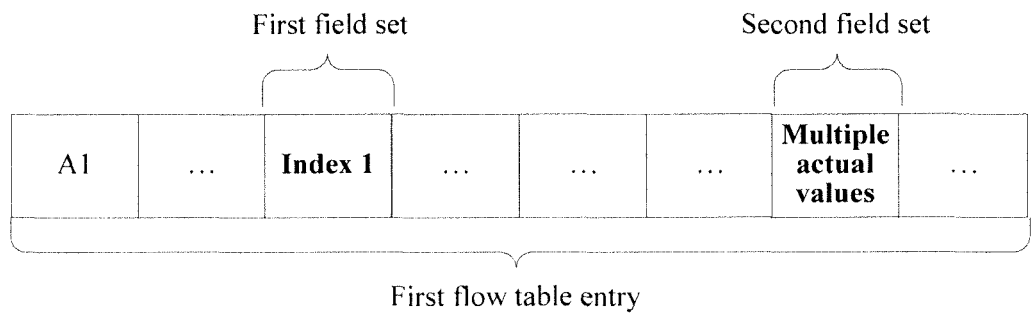
FIG. 1-f
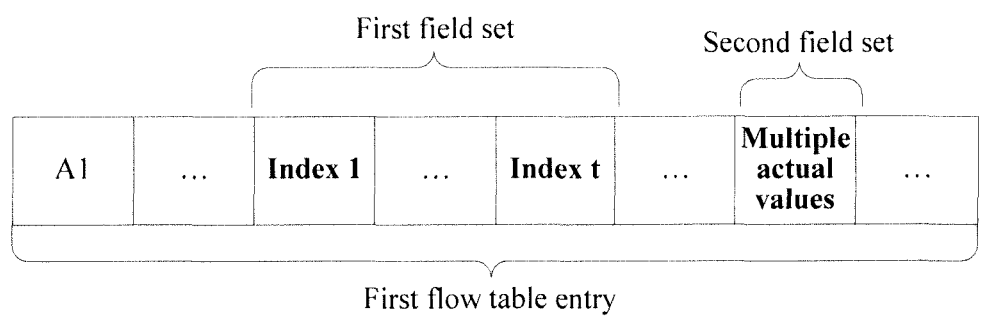
FIG. 1-g

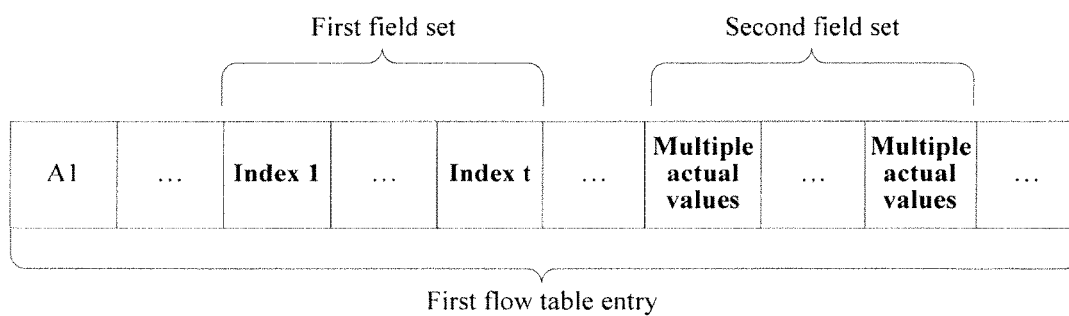
FIG. 1-h
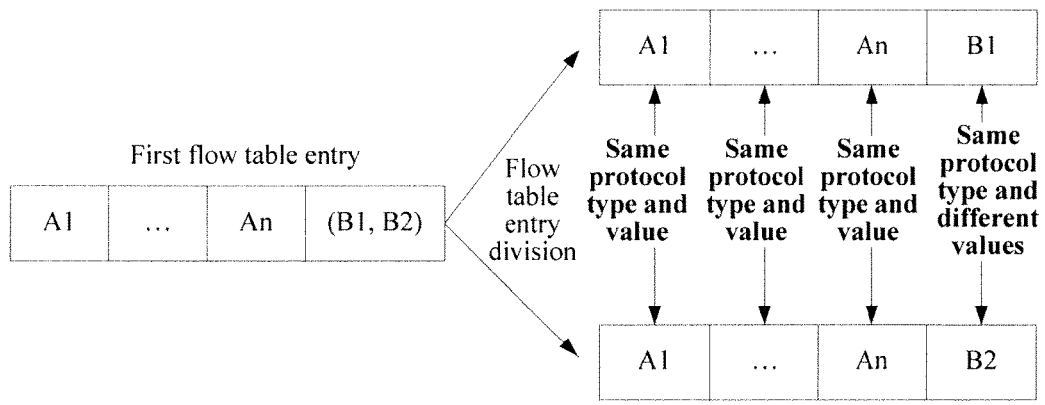
FIG. 1-i

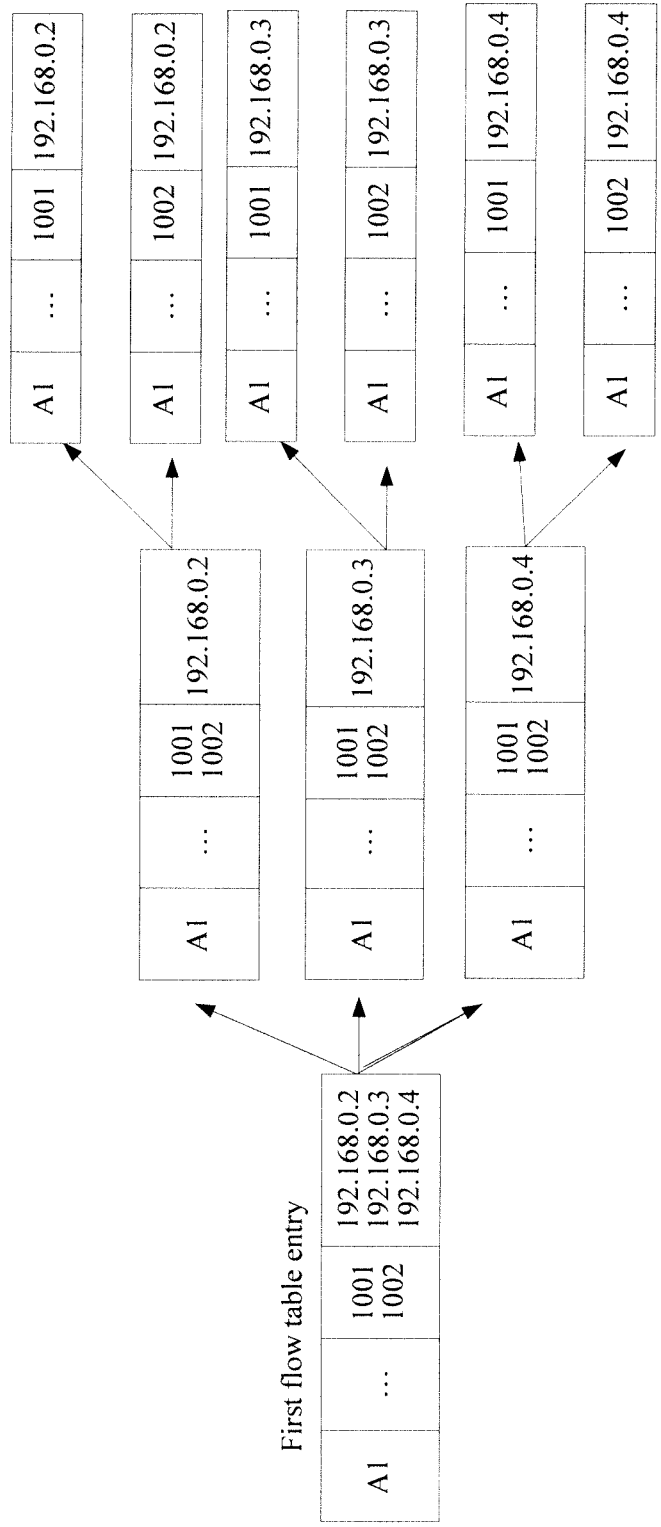
FIG. 1-j

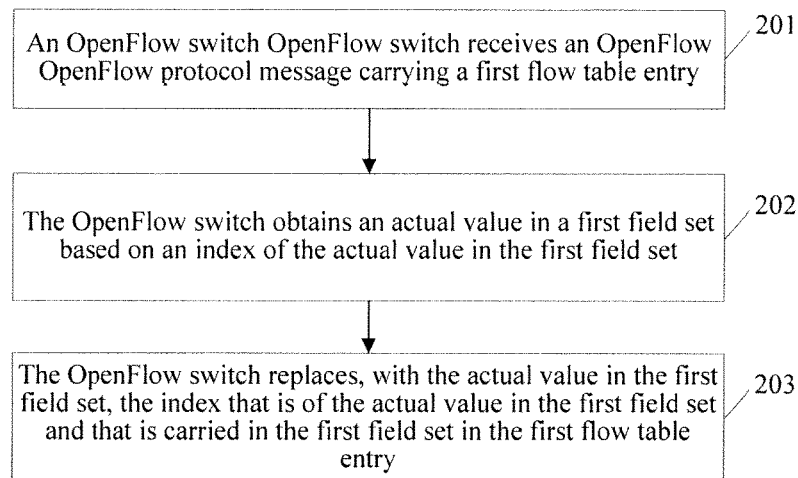
FIG. 2-a
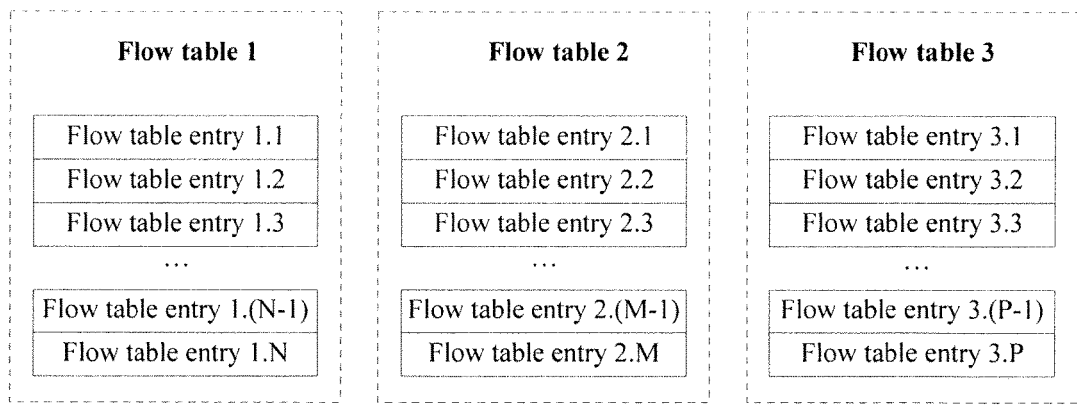
FIG. 2-b
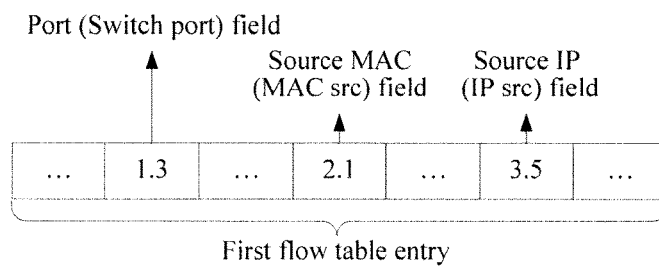
FIG. 2-c

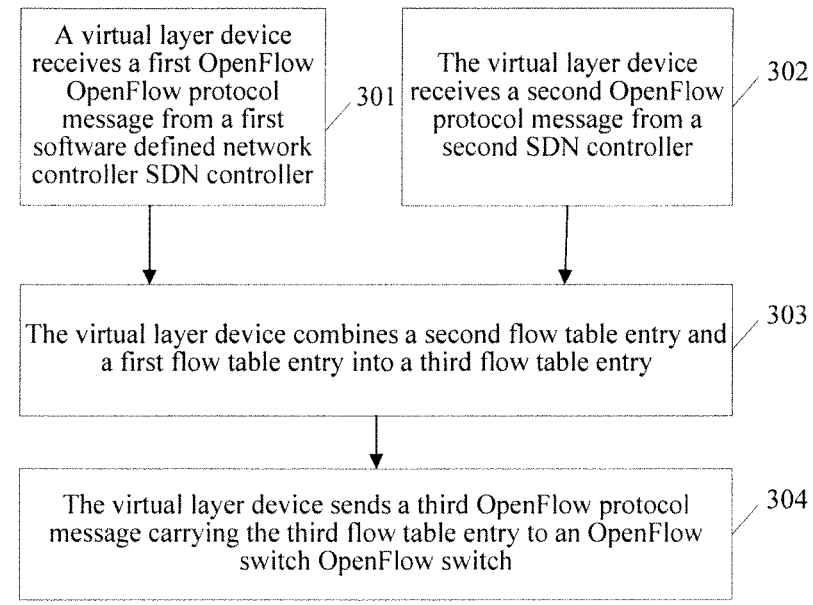
FIG. 3-a
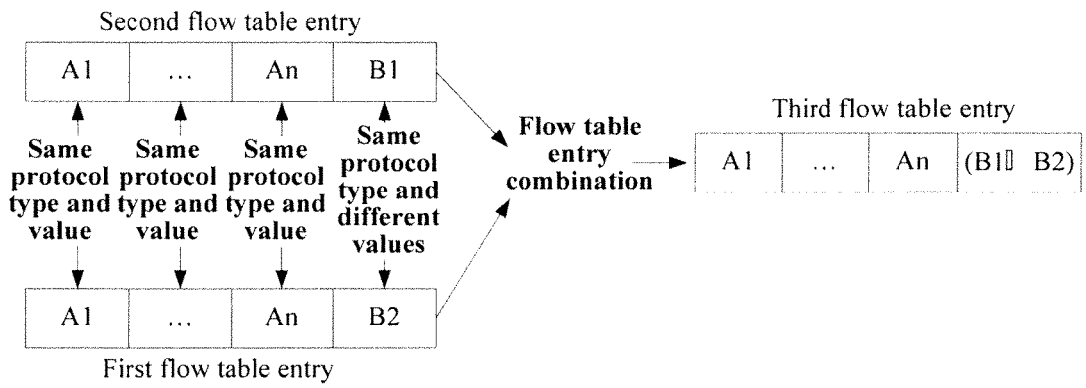
FIG. 3-b

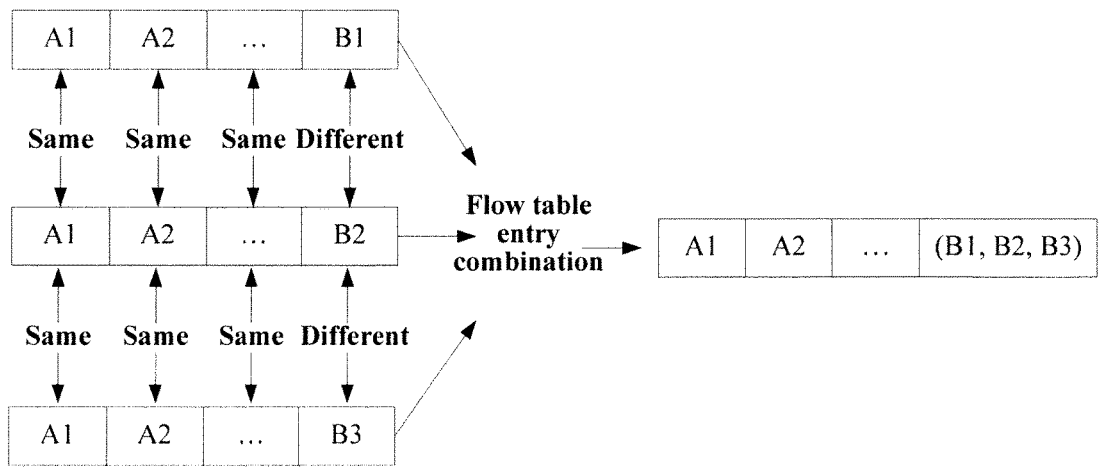
FIG. 3-c
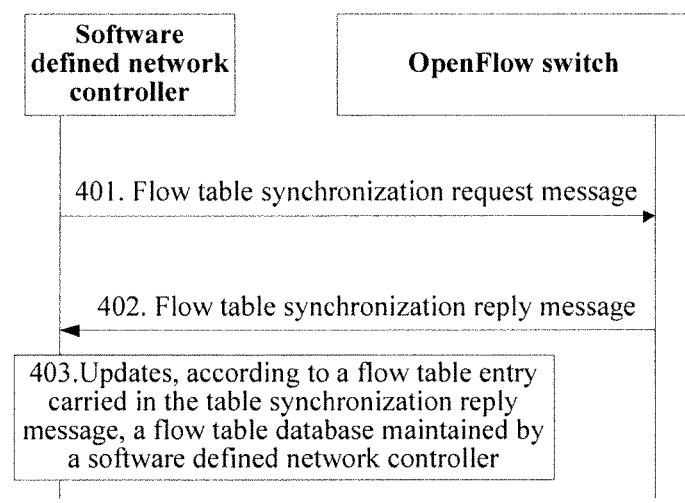
FIG. 4

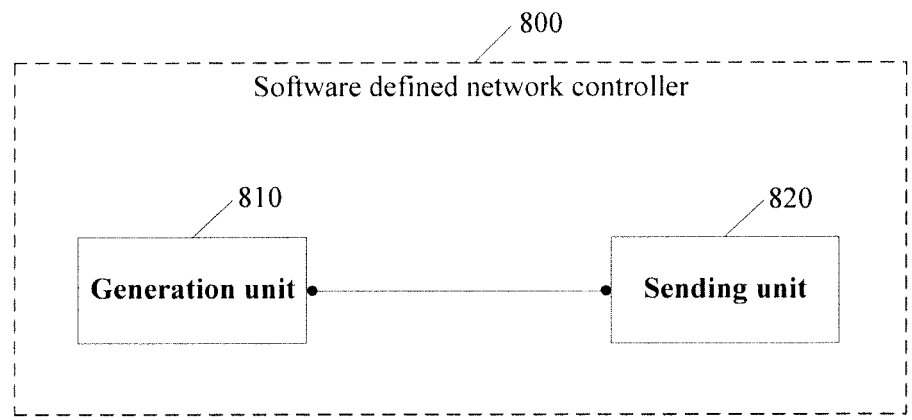
FIG. 8-a
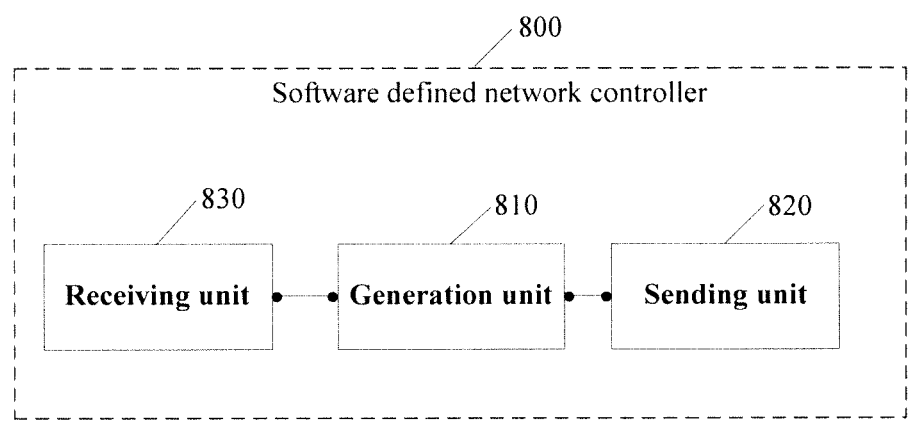
FIG. 8-b
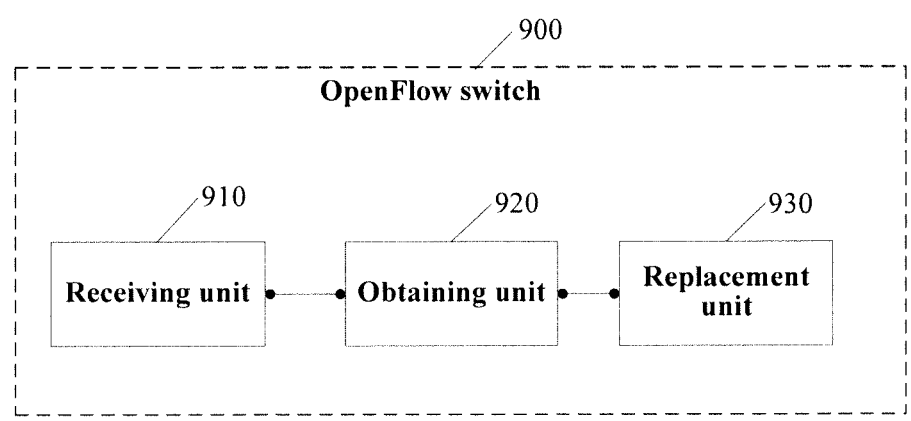
FIG. 9-a

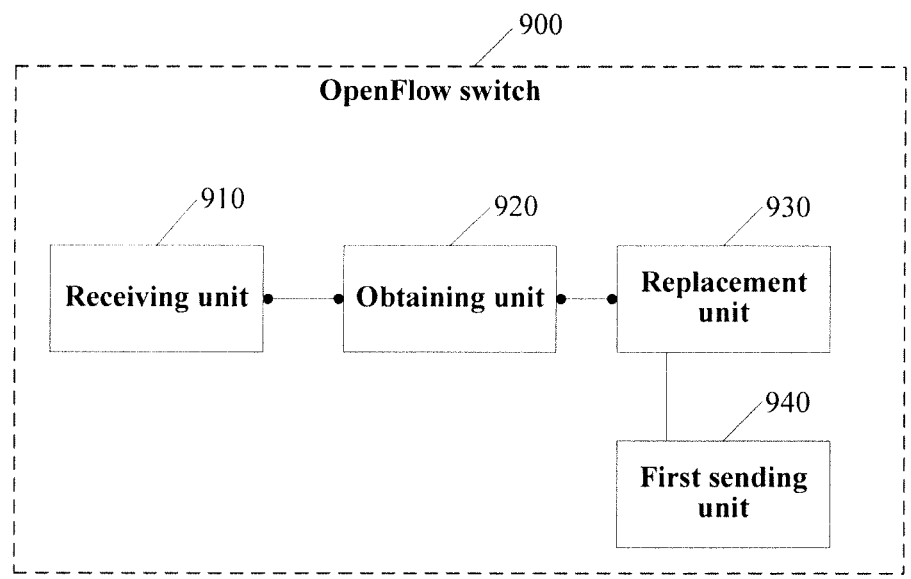
FIG. 9-b
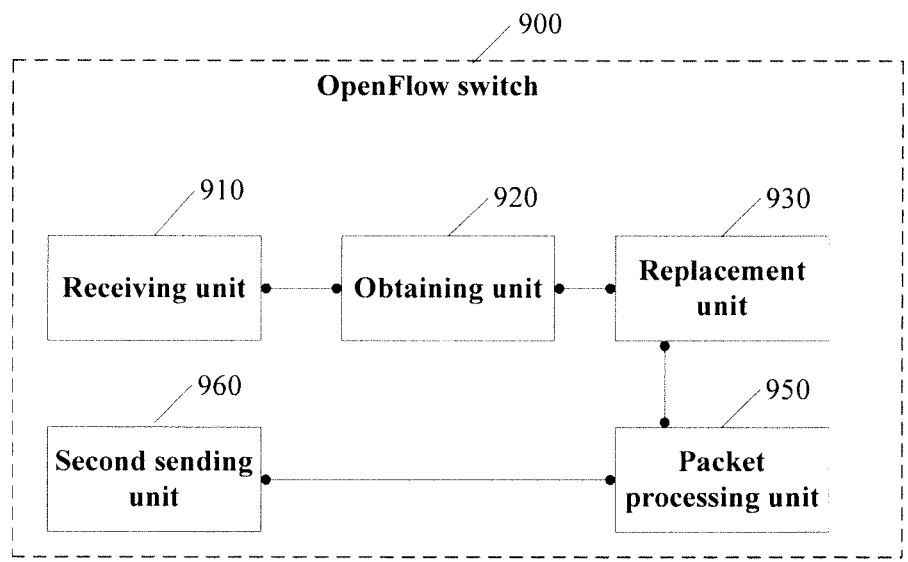
FIG. 9-c

FLOW TABLE MANAGEMENT METHOD, AND RELATED DEVICE AND SYSTEM

CROSS-REFERENCE TO RELATED APPLICATIONS

This application is a continuation of International Application No. PCT/CN2014/078551, filed on May 27, 2014, the disclosure of which is hereby incorporated by reference in its entirety.

TECHNICAL FIELD

The present invention relates to the field of network communications technologies, and specifically, to a flow table management method, and a related device and a communications system.

BACKGROUND

An OpenFlow (OpenFlow) technology was originally proposed by Stanford University to resolve, by using an innovative internetworking concept and based on technical conditions of the Transmission Control Protocol/Internet Protocol (TCP/IP), various bottleneck problems that occur when new services are provided on current networks.

According to a core idea of the OpenFlow technology, a packet forwarding process that is originally entirely controlled by a switching device (the switching device may be, for example, a switch or a router) changes to be collaboratively completed by an OpenFlow switch (OpenFlow switch) and a software defined network (SDN) controller (SDN Controller).

The SDN controller may deliver, to the OpenFlow switch actively or when the OpenFlow switch sends a request, a flow table entry used to indicate a packet forwarding processing manner. The OpenFlow switch performs, according to the flow table entry delivered by the SDN controller, forwarding processing on a received packet that matches the flow table entry.

In the prior art, the flow table entry delivered by the SDN controller to the OpenFlow switch at any time is a complete standard flow table entry. The SDN controller sometimes also delivers tens or hundreds of flow table entries to the OpenFlow switch at one time. When the SDN controller delivers complete standard flow table entries, in some cases, relatively high overheads of a control channel may be caused, which increases a congestion risk of the control channel, and a relatively large quantity of network processing resources of both the SDN controller and the OpenFlow switch are occupied.

SUMMARY

Embodiments of the present invention provide a flow table management method, devices, and systems, so as to reduce a data volume of flow table entries delivered by an SDN controller to an OpenFlow switch, thereby reducing overheads of a control channel to reduce a congestion risk of the control channel, and reducing occupied network processing resources of the SDN controller and the OpenFlow switch to deliver the flow table entries.

According to a first aspect, a flow table management method includes:

generating, by a software defined network controller, a first flow table entry, where a first field set in the first flow table entry carries an index of an actual value in the first field set, the first field set includes N fields, and N is a positive integer; and sending, by the software defined network controller, an OpenFlow protocol message to an OpenFlow switch, where the OpenFlow protocol message carries the first flow table entry.

With reference to the first aspect, in a first possible implementation manner of the first aspect, the index is a flow table entry identifier of a flow table entry stored in the OpenFlow switch.

With reference to the first aspect or the first possible implementation manner of the first aspect, in a second possible implementation manner of the first aspect, each field in a second field set in the first flow table entry carries multiple actual values, where the second field set includes M fields, and M is a positive integer.

With reference to the first aspect or the first possible implementation manner of the first aspect or the second possible implementation manner of the first aspect, in a third possible implementation manner of the first aspect, before the generating a first flow table entry, the method further includes: receiving, by the software defined network controller, a first packet or a packet header of a first packet from a switch, and determining, according to a preset processing policy, a routing instruction set used to process the first packet, where an instruction field of the first flow table entry carries the routing instruction set or an index of the routing instruction set.

According to a second aspect, a flow table management method includes:

receiving, by an OpenFlow switch, an OpenFlow protocol message, where the OpenFlow protocol message carries a first flow table entry, a first field set in the first flow table entry carries an index of an actual value in the first field set, the first field set includes N fields, and N is a positive integer;

obtaining, by the OpenFlow switch, the actual value in the first field set based on the index of the actual value in the first field set; and replacing, by the OpenFlow switch with the actual value in the first field set, the index that is of the actual value in the first field set and that is carried in the first field set in the first flow table entry.

With reference to the second aspect, in a first possible implementation manner of the second aspect, the index is a flow table entry identifier of a flow table entry stored in the switch, and the obtaining the actual value in the first field set based on the index in the first field set includes: obtaining, based on the flow table entry identifier, an actual value filled in a third field set that is in the flow table entry represented by the flow table entry identifier and that has a same protocol type as the first field set, where fields that are in the third field set and the first field set and that have a same protocol type have a same actual value.

With reference to the second aspect or the first possible implementation manner of the second aspect, in a second possible implementation manner of the second aspect, the method further includes: sending, by the OpenFlow switch, the stored first flow table entry or an identifier of the first flow table entry to a software defined network controller.

With reference to the second aspect or the first possible implementation manner of the second aspect or the second possible implementation manner of the second aspect, in a third possible implementation manner of the second aspect, before the OpenFlow switch receives the first flow table entry, the method further includes:

sending, by the OpenFlow switch, a first packet or a packet header of a first packet to the software defined network controller, where an instruction field of the first flow table entry carries a routing instruction set used to process the first packet or an index of a routing instruction set; and the method further includes: processing, by the OpenFlow switch, the first packet based on the routing instruction set.

According to a third aspect, a flow table relay method may include:

receiving, by a virtual layer device, a first OpenFlow protocol message from a first software defined network controller, where the first OpenFlow protocol message carries a first flow table entry, and a first field in the first flow table entry carries an index of an actual value in the first field;

receiving, by the virtual layer device, a second OpenFlow protocol message from a second software defined network controller, where the second OpenFlow protocol message carries a second flow table entry, and a fourth field in the second flow table entry carries an index of an actual value in the fourth field;

combining, by the virtual layer device, the first flow table entry and the second flow table entry into a third flow table entry; and sending, by the virtual layer device, a third OpenFlow protocol message carrying the third flow table entry to an OpenFlow switch.

According to a fourth aspect, a software defined network controller may include:

a generation unit, configured to generate a first flow table entry, where a first field set in the first flow table entry carries an index of an actual value in the first field set, the first field set includes N fields, and N is a positive integer; and a sending unit, configured to send an OpenFlow protocol message to an OpenFlow switch, where the OpenFlow protocol message carries the first flow table entry.

With reference to the fourth aspect, in a first possible implementation manner of the fourth aspect, the index is a flow table entry identifier of a flow table entry stored in the OpenFlow switch.

With reference to the fourth aspect or the first possible implementation manner of the fourth aspect, in a second possible implementation manner of the fourth aspect, each field in a second field set in the first flow table entry carries multiple actual values, where the second field set includes M fields, and M is a positive integer.

With reference to the fourth aspect or the first possible implementation manner of the fourth aspect or the second possible implementation manner of the fourth aspect, in a third possible implementation manner of the fourth aspect, the software defined network controller further includes a receiving unit, configured to: before the generation unit generates the first flow table entry, receive a first packet or a packet header of a first packet from a switch, and determine, according to a preset processing policy, a routing instruction set used to process the first packet, where an instruction field of the first flow table entry carries the routing instruction set or an index of the routing instruction set.

According to a fifth aspect, an OpenFlow switch may include:

a receiving unit, configured to receive an OpenFlow protocol message, where the OpenFlow protocol message carries a first flow table entry, a first field set in the first flow table entry carries an index of an actual value in the first field set, the first field set includes N fields, and N is a positive integer;

an obtaining unit, configured to obtain the actual value in the first field set based on the index of the actual value in the first field set; and a replacement unit, configured to replace, with the actual value of the first field set that is obtained by the obtaining unit, the index that is of the actual value in the first field set and that is carried in the first field set in the first flow table entry.

With reference to the fifth aspect, in a first possible implementation manner of the fifth aspect, the index is a flow table entry identifier of a flow table entry stored in the OpenFlow switch, where the obtaining unit is specifically configured to obtain, based on the flow table entry identifier, an actual value filled in a third field set that is in the flow table entry represented by the flow table entry identifier and that has a same protocol type as the first field set, where fields that are in the third field set and the first field set and that have a same protocol type have a same actual value.

With reference to the fifth aspect or the first possible implementation manner of the fifth aspect, in a second possible implementation manner of the fifth aspect, the OpenFlow switch further includes: a first sending unit, configured to send the stored first flow table entry or an identifier of the first flow table entry to a software defined network controller.

With reference to the fifth aspect or the first possible implementation manner of the fifth aspect or the second possible implementation manner of the fifth aspect, in a third possible implementation manner of the fifth aspect, the OpenFlow switch further includes:

a second sending unit, configured to: before the first flow table entry is received, send a first packet or a packet header of a first packet to the software defined network controller, where an instruction field of the first flow table entry carries a routing instruction set used to process the first packet or an index of a routing instruction set; and a packet processing unit, configured to process the first packet based on the routing instruction set.

According to a sixth aspect, a virtual layer device includes:

a receiving unit, configured to receive a first OpenFlow protocol message from a first software defined network controller, where the first OpenFlow protocol message carries a first flow table entry, and a first field in the first flow table entry carries an index of an actual value in the first field; and receive a second OpenFlow OpenFlow protocol message from a second software defined network controller, where the second OpenFlow protocol message carries a second flow table entry, and a fourth field in the second flow table entry carries an index of an actual value in the fourth field;

a combining unit, configured to combine the first flow table entry and the second flow table entry into a third flow table entry; and a sending unit, configured to send a third OpenFlow protocol message carrying the third flow table entry to an OpenFlow switch.

According to a seventh aspect, a communications system includes:

a software defined network controller, configured to generate a first flow table entry, where a first field set in the first flow table entry carries an index of an actual value in the first field set, the first field set includes N fields, and N is a positive integer; and send an OpenFlow protocol message to an OpenFlow switch, where the OpenFlow protocol message carries the first flow table entry; and the OpenFlow switch, configured to: receive the OpenFlow protocol message; obtain the actual value in the first field set based on the index of the actual value in the first field set; and replace, with the actual value in the first field set, the index that is of the actual value in the first field set and that is carried in the first field set in the first flow table entry.

According to an eighth aspect, a communications system includes:

a first software defined network controller, configured to send a first OpenFlow OpenFlow protocol message, where the first OpenFlow protocol message carries a first flow table entry, and a first field in the first flow table entry carries an index of an actual value in the first field;

a second software defined network controller, configured to send a second OpenFlow protocol message, where the second OpenFlow protocol message carries a second flow table entry, and a fourth field in the second flow table entry carries an index of an actual value in the fourth field;

a virtual layer device, configured to receive the first OpenFlow protocol message from the first software defined network controller; receive the second OpenFlow protocol message from the second software defined network controller; combine the first flow table entry and the second flow table entry into a third flow table entry; and send a third OpenFlow protocol message carrying the third flow table entry to the OpenFlow switch; and the OpenFlow switch, configured to: receive the third OpenFlow protocol message; divide the third flow table entry carried in the third OpenFlow protocol message into the first flow table entry and the second flow table entry; obtain the actual value of the first field based on the index of the actual value of the first field; obtain the actual value of the fourth field based on the index of the actual value of the fourth field; replace the index, of the actual value in the first field, carried in the first field in the first flow table entry with the actual value in the first field; and replace the index, of the actual value of the fourth field, carried in the fourth field in the second flow table entry with the actual value of the fourth field.

It may be seen that, in the solutions in the embodiments of the present invention, for a first flow table entry carried in an OpenFlow protocol message sent by an SDN controller to an OpenFlow switch, a first field set in the first flow table entry carries an index of an actual value in the first field set, instead of carrying the actual value in the first field set. In a technical implementation, a data volume of an index of an actual value of a field is usually less than or even far less than that of the actual value of the field. Therefore, a mechanism of delivering a flow table entry in the embodiments helps reduce overheads of a control channel between the SDN controller and the OpenFlow switch, thereby reducing a congestion risk of the control channel, also helps reduce consumption of network resources of a switching device, and helps meet a requirement of complex networking.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 1-*a* is a schematic flowchart of a flow table management method according to an embodiment of the present invention;

FIG. 1-*b* is a schematic diagram of a flow table entry delivered by an SDN according to an embodiment of the present invention;

FIG. 1-*c* is a schematic diagram of another flow table entry delivered by an SDN according to an embodiment of the present invention;

FIG. 1-*d* is a schematic diagram of another flow table entry delivered by an SDN according to an embodiment of the present invention;

FIG. 1-*e* is a schematic diagram of another flow table entry delivered by an SDN according to an embodiment of the present invention;

FIG. 1-*f* is a schematic diagram of another flow table entry delivered by an SDN according to an embodiment of the present invention;

FIG. 1-*g* is a schematic diagram of another flow table entry delivered by an SDN according to an embodiment of the present invention;

FIG. 1-*h* is a schematic diagram of another flow table entry delivered by an SDN according to an embodiment of the present invention;

FIG. 1-*i* is a schematic diagram of division of a flow table entry according to an embodiment of the present invention;

FIG. 1-*j* is another schematic diagram of division of a flow table entry according to an embodiment of the present invention;

FIG. 2-*a* is a schematic flowchart of another flow table management method according to an embodiment of the present invention;

FIG. 2-*b* is a schematic diagram of a flow table stored by an OpenFlow switch according to an embodiment of the present invention;

FIG. 2-*c* is a schematic diagram of another flow table entry delivered by an SDN according to an embodiment of the present invention;

FIG. 3-*a* is a schematic flowchart of another flow table management method according to an embodiment of the present invention;

FIG. 3-*b* is a schematic diagram of combination of flow table entries according to an embodiment of the present invention;

FIG. 3-*c* is another schematic diagram of combination of flow table entries according to an embodiment of the present invention;

FIG. 4 is a schematic flowchart of another flow table management method according to an embodiment of the present invention;

FIG. 8-*a* is a schematic structural diagram of an SDN controller according to an embodiment of the present invention;

FIG. 8-*b* is a schematic structural diagram of another SDN controller according to an embodiment of the present invention;

FIG. 9-*a* is a schematic structural diagram of an OpenFlow switch according to an embodiment of the present invention;

FIG. 9-*b* is a schematic structural diagram of another OpenFlow switch according to an embodiment of the present invention;

FIG. 9-*c* is a schematic structural diagram of another OpenFlow switch according to an embodiment of the present invention;

DESCRIPTION OF EMBODIMENTS

Figure 5:
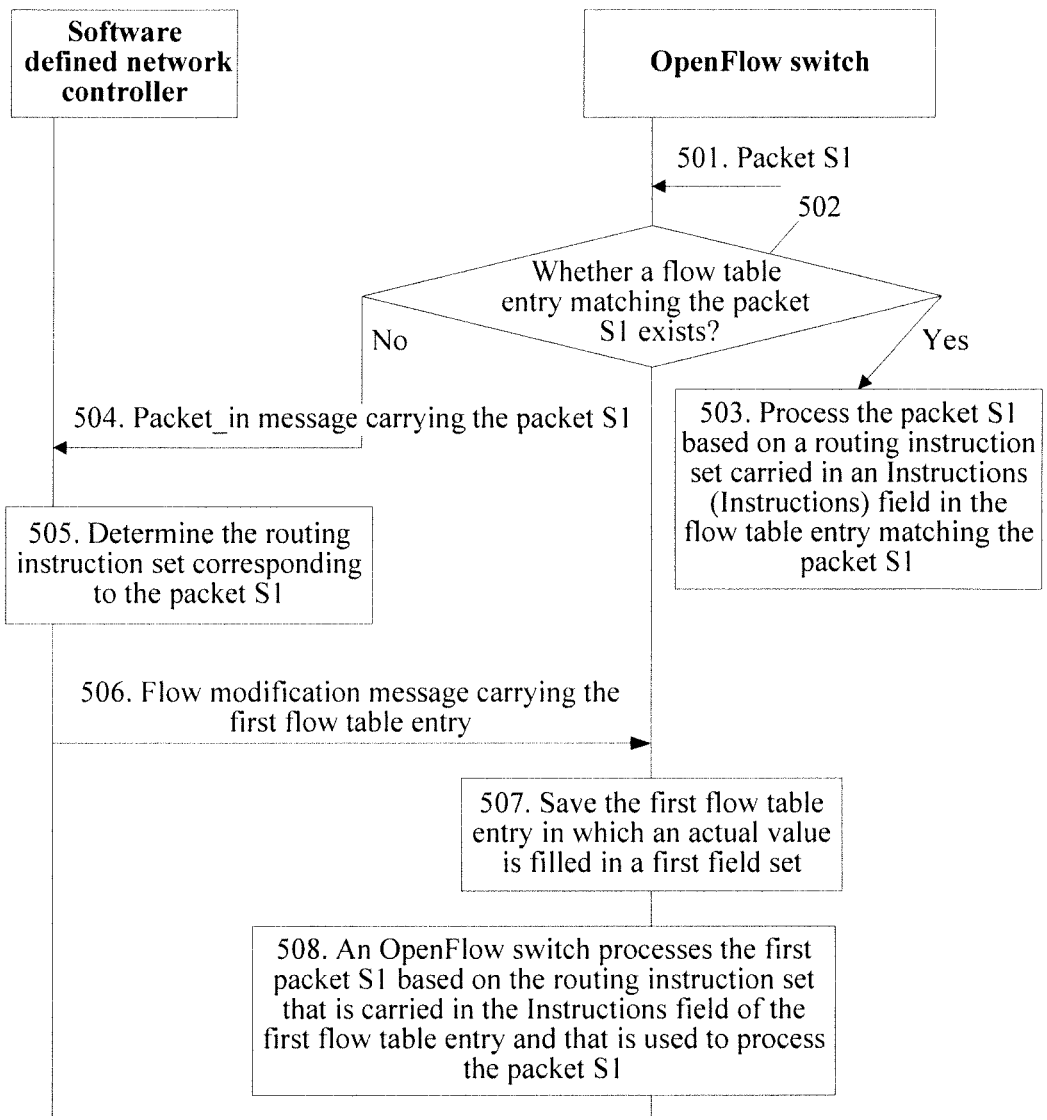
FIG. 5 is a schematic flowchart of another flow table management method according to an embodiment of the present invention.

Embodiments of the present invention provide a flow table management method, devices, and systems, so as to reduce a data volume of flow table entries delivered by an SDN controller to an OpenFlow switch, thereby reducing overheads of a control channel to reduce a congestion risk of the control channel, and reducing occupied network processing resources of the SDN controller and the OpenFlow switch to deliver the flow table entries.

To make a person skilled in the art understand the technical solutions in the present invention better, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Detailed descriptions are separately provided below.

In the specification, claims, and accompanying drawings of the present invention, the terms "first", "second", "third", "fourth", and so on are intended to distinguish between different objects but do not indicate a particular order. In addition, the terms "including", "including", or any other variant thereof, are intended to cover a non-exclusive inclusion. For example, a process, a method, a system, a product or a device that includes a series of steps or units is not limited to the listed steps or units, and instead, may include steps or units that are not listed.

In an embodiment of a flow table management method according to the present invention, the flow table management method includes: generating, by an SDN controller, a first flow table entry, where a first field set in the first flow table entry carries an index of an actual value in the first field set, the first field set includes N fields, and N is a positive integer; and sending an OpenFlow protocol message to an OpenFlow switch, where the OpenFlow protocol message carries the first flow table entry.

First, referring to FIG. 1-*a*, FIG. 1-*a* is a schematic flowchart of a flow table management method according to an embodiment of the present invention. As shown in FIG. 1-*a*, the flow table management method according to this embodiment of the present invention may include the following content.

101: An SDN controller generates a first flow table entry.

The SDN controller may generate a flow table entry (which may be referred to as a first flow table entry for ease of subsequent reference) based on a preset policy, or the SDN controller may generate the first flow table entry when being triggered by a user instruction or an OpenFlow switch. Certainly, the SDN controller may generate one or more flow table entries when being triggered by another condition.

In an SDN architecture, the SDN controller determines a transmission path of a data packet in a network. An OpenFlow switch locally stores several flow tables (Flow Tables), and each Flow Table may include several flow table entries. If a Flow Table locally stored in the OpenFlow switch has a flow table entry that matches a data packet (for example, a packet) that needs to be forwarded by the OpenFlow switch, the OpenFlow switch performs, based on the the flow table entry that is in the Flow Table and that matches the data packet, forwarding processing on the data packet. In addition, if no flow table entry in the locally stored Flow Table matches the data packet, the OpenFlow switch may send the data packet or a packet header of the data packet to the SDN controller to determine a corresponding forwarding processing manner. The SDN controller feeds back, to the OpenFlow switch, a new flow table entry that matches the data packet. The OpenFlow switch then performs forwarding processing on the data packet according to the new flow table entry that is delivered by the SDN controller and that matches the data packet. This means that devices in an OpenFlow network can be deployed in a distributed manner and be managed and controlled in a centralized manner. In this case, the OpenFlow network is in a software defined form, and therefore, the OpenFlow network is also referred to as an SDN. The SDN may provide a programmable interface, to enable a network user to determine how to route a data packet, how to implement load balance, how to perform access control, or the like. In this way, generally, only hundreds of lines of code need to be written on the SDN controller to deploy a new routing protocol or security algorithm in the SDN. Therefore, the openness of the SDN helps accelerate fast development and deployment of new network applications.

It should be noted that the OpenFlow switch mentioned in the embodiments of the present invention is a switching device that supports an OpenFlow protocol. The switching device that supports the OpenFlow protocol may be, for example, a data packet (for example, a packet) forwarding device such as a router or a switch that supports the OpenFlow protocol.

102: The SDN controller sends an OpenFlow protocol message to an OpenFlow switch.

The OpenFlow protocol message carries the first flow table entry, a first field set in the first flow table entry carries an index of an actual value in the first field set, the first field set includes N fields, and N is a positive integer. The OpenFlow protocol message that carries the first flow table entry may be, for example, a flow modification (flow_mod) message or another OpenFlow protocol message.

It may be understood that, the first flow table entry may have a data structure that is the same as that of a standard flow table entry. For example, a type of a protocol field included in the first flow table entry and a location relationship between all types of protocol fields in the first flow table entry may be the same as those in the standard flow table entry. However, a type of information carried in some or all of the protocol fields in the first flow table entry is different from that in the standard flow table entry. Specifically, a field in the first field set in the first flow table entry carries an index of an actual value of the field, while each field in the standard flow table entry carries an actual value of the field.

N in the embodiments of the present invention may be, for example, equal to 1, 2, 5, 8, 10, or another value.

The N fields included in the first field set may be any N fields in the first flow table entry. The N fields included in the first field set may be adjacent N fields, partially adjacent N fields or nonadjacent N fields in the first flow table entry, that is, locations where fields in the first field set may be arbitrarily distributed in the first flow table entry, which helps more flexibly meet flexible requirements of various actual application scenarios. The N fields may, for example, include at least one of the following fields: a port number field, a source IP address field, a destination IP address field, a destination media access control (MAC, Media Access Control) address field, a virtual local area network identifier field, a source MAC address field, or the like. An actual value of a field in the first field set represents a standard value that the field should carry. For example, an actual value of the port number field is a port number, an actual value of the source IP address field is a source IP address, an actual value of the destination IP address field is a destination IP address, an actual value of the destination MAC address field is a destination MAC address, an actual value of the virtual local area network identifier field is a virtual local area network identifier, an actual value of the source MAC address field is a source MAC address, and an actual value of another field is deduced accordingly. In this embodiment of the present invention, a field in the first field set in the first flow table entry delivered by the SDN controller does not carry an actual value of the field, but instead carries an index of the actual value of the field, where the index is information by using which the actual value of the field can be indexed. Assuming that the first field set includes a port number field, the port number field does not carry a port number, but instead carries an index by using which the port number can be indexed. For another example, the first field set includes a source IP address field, and the source IP address field does not carry a source IP address, but instead carries an index by using which the source IP address can be indexed. For another example, the first field set includes a destination IP address field, and the destination IP address field does not carry a destination IP address, but instead carries an index by using which the destination IP address can be indexed. For another example, the first field set includes a virtual local area network identifier field, and the virtual local area network identifier field does not carry a virtual local area network identifier, but instead carries an index by using which the virtual local area network identifier can be indexed. For another example, the first field set includes a destination MAC address field, and the destination MAC address field does not carry a destination MAC address, but instead carries an index by using which the destination MAC address can be indexed. For another example, the first field set includes a source MAC address field, and the source MAC address field does not carry a source MAC address, but instead carries an index by using which the source MAC address can be indexed. If the first field set further includes another protocol field, a related case is deduced accordingly.

It may be understood that, the index of the actual value may be of various types, and a requirement may be met as long as the OpenFlow switch can obtain the actual value according to the index of the actual value. In some implementation manners of the present invention, the index of the actual value may be, for example, a flow table entry identifier of a flow table entry stored in the OpenFlow switch, that is, an index carried in any field in the first field set in the first flow table entry carried in the OpenFlow protocol message may be a flow table entry identifier of a flow table entry stored in the OpenFlow switch. It may be understood that, if N is greater than 1, indexes carried in fields in the first field set may be completely the same, partially the same or completely different (for example, the indexes carried in the fields in the first field set may be specifically a same flow table entry identifier). It may be understood that, if an index of an actual value of a field is a flow table entry identifier of a flow table entry already stored in the OpenFlow switch, not only a manner of indexing to the actual value of the field by the OpenFlow switch may be greatly simplified, but also efficiency of indexing to the actual value of the field by the OpenFlow switch may be improved. Moreover, the flow table entry identifier usually has a relatively small data volume, which helps an SDN controller relatively desirably control a data volume of the delivered first flow table entry.

In some implementation manners of the present invention, each field in a second field set in the first flow table entry may further carry multiple actual values of the field. The second field set includes M fields, and M is a positive integer. Examples of the actual values of the fields are described above. It may be understood that, because each field in the second field set may further carry multiple actual values of the field, it equivalently indicates that the first flow table entry may be divided into multiple flow table entries, which also helps the SDN controller to relatively desirably control a data volume of the delivered first flow table entry. For example, the second field set in the first flow table entry includes a destination MAC address field, and the destination MAC address field carries three destination MAC addresses (for example, information carried in the destination MAC address field is as follows: 192.168.0.2, 192.168.0.3, and 192.168.0.4, or information carried in the destination MAC address field is as follows: 192.168.0.2 to 192.168.0.4, and two manners in the foregoing examples may both represent that the destination MAC address field carries three destination MAC addresses; certainly, it may be represented in another manner that the destination MAC address field carries three MAC addresses). In this scenario, the OpenFlow switch may divide the first flow table entry into four flow table entries. Destination MAC address fields of the three flow table entries respectively carry a different one of the foregoing three destination MAC addresses, and other fields of the three flow table entries are the same. Certainly, if another field of the three flow table entries also carries multiple actual values, the three flow table entries may be respectively divided according to a similar manner. For example, a virtual local area network identifier field of the three flow table entries that is obtained through division carries two virtual local area network identifiers, each flow table entry of the three flow table entries may be further divided into two flow table entries. A specific division manner may be shown in FIG. 1-$i$ and FIG. 1-$j$. Division may stop only when each field of an obtained flow table entry carries only one actual value or an index of one actual value of the field. M in the embodiments of the present invention may be, for example, equal to 1, 2, 5, 8, 10, or another value.

The M fields included in the second field set in the first flow table entry may be any M fields that are in the first flow table entry and that are different from any field in the first field set. The M fields included in the second field set may be adjacent M fields, partially adjacent M fields or nonadjacent M fields in the first flow table entry. The M fields may include, for example, at least one of the following fields: a port number field, a source IP address field, a destination IP address field, a destination MAC address field, a virtual local area network identifier field, a source MAC address field, a protocol field, or the like.

An intersection of the second field set and the first field set is an empty set.

Examples of several possible structures of the first flow table entry are provided below by using the accompanying drawings.

Referring to FIG. 1-$b$ to FIG. 1-$e$, FIG. 1-$b$ shows an example in which the first field set in the first flow table entry includes one field, and the field carries an index of an actual value of the field. FIG. 1-$c$ shows an example in which the first field set in the first flow table entry includes two adjacent fields, and each of the two adjacent fields carries an index of an actual value of the field. FIG. 1-$d$ shows an example in which the first field set in the first flow table entry includes t1 adjacent fields (where t1 is a positive integer greater than 2), where each of the t1 adjacent fields carries an index of an actual value of the field. FIG. 1-$e$ shows an example in which the first field set in the first flow table entry includes two nonadjacent fields, and each of the two nonadjacent fields carries an index of an actual value of the field. It may be understood that, a scenario in which the first field set includes more fields may be deduced accordingly.

For another example, referring to FIG. 1-$f$ to FIG. 1-$h$, FIG. 1-$f$ shows an example in which the first flow table entry includes the first field set and the second field set, the first field set includes one field, and the field carries an index of an actual value of the field; and the second field set also includes one field, the field carries multiple actual values used to describe the field. FIG. 1-$g$ shows an example in which the first field set in the first flow table entry includes multiple adjacent fields, and each of the multiple adjacent fields carries an index of an actual value of the field, whereas the second field set includes one field, and the field carries multiple actual values of the field. FIG. 1-$h$ shows an example in which the first field set in the first flow table entry includes multiple adjacent fields, where each of the multiple adjacent fields carries an index of an actual value of the field; whereas the second field set also includes multiple fields, and each of the multiple fields included in the second field set carries multiple actual values of the field. It may be understood that, a scenario in which the first field set and the second field set include more fields may be deduced accordingly.

In some implementation manners of the present invention, before generating the first flow table entry, the SDN controller may further receive a first packet from the OpenFlow switch, and may determine a routing instruction set of the first packet according to a preset processing policy. An instructions (Instructions) field of the first flow table entry carries the routing instruction set or an index of the routing instruction set, where the index may be, for example, a flow table entry identifier of a flow table entry stored in the OpenFlow switch. Further, after obtaining the first flow table entry, the OpenFlow switch may process the first packet based on the routing instruction set (or the routing instruction set obtained based on the index of the routing instruction set) carried in the Instructions field of the first flow table entry.

For example, the receiving, by the SDN controller, a first packet from the OpenFlow switch or a packet of a first packet from the OpenFlow switch may include: receiving, by the SDN controller, an OpenFlow protocol message (where the OpenFlow protocol message may be, for example, a packet_in (packet_in) message or another OpenFlow protocol message) that is from the OpenFlow switch and that carries the first packet or the packet header of the first packet. Certainly, the OpenFlow protocol message may further carry one or more other packets or packet headers. Certainly, the OpenFlow protocol message may further carry other information.

In some implementation manners of the present invention, for a same flow table entry, flow table entry identifiers that are in the OpenFlow switch and the SDN controller and that are used to identify the same flow table entry may be the same or may have an agreed mapping relationship. If flow table entry identifiers having a specified mapping relationship are used in the OpenFlow switch and the SDN controller to identify a same flow table entry, both the OpenFlow switch and the SDN controller may deduce, by using the specified mapping relationship, a flow table entry identifier of the same flow table entry in the peer-end device.

One SDN controller may manage multiple OpenFlow switches (that is, a same SDN controller may deliver flow table entries to multiple OpenFlow switches). One OpenFlow switch may be managed by one or more SDN controllers (that is, multiple SDN controllers may deliver flow table entries to a same OpenFlow switch).

In some implementation manners of the present invention, information exchanged between the SDN controller and the OpenFlow switch may be forwarded by a virtual layer device (if the virtual layer device exists) to reach the peer end. The virtual layer device may transparently transmit the information exchanged between the SDN controller and the OpenFlow switch, or may perform particular relay processing (relay processing such as division of a flow table entry and combination of flow table entries) on the information exchanged between the SDN controller and the OpenFlow switch and then forwards the information to the peer end. For example, the OpenFlow protocol message sent by the SDN controller to the OpenFlow switch may be forwarded by the virtual layer device (if the virtual layer device exists) to reach the OpenFlow switch. Similarly, the OpenFlow protocol message sent by the OpenFlow switch to the SDN controller may be forwarded by the virtual layer device to the SDN controller, and certainly there may further be another relay device.

The virtual layer device in this embodiment of the present invention may be a device that can perform virtualization on a physical OpenFlow switch. The virtual layer device may, for example, virtualize one physical OpenFlow switch into multiple virtual OpenFlow switches. In the technical solution in this embodiment of the present invention, the major focus is the issue that the virtual layer device performs relay forwarding on the information exchanged between the SDN controller and the OpenFlow switch.

It may be seen that, in the solution in this embodiment, for a first flow table entry carried in an OpenFlow protocol message sent by an SDN controller to an OpenFlow switch, a first field set in the first flow table entry carries an index of an actual value in the first field set, instead of carrying the actual value in the first field set. In a technical implementation, a data volume of an index of an actual value of a field is usually less than or even far less than that of the actual value of the field. Therefore, a mechanism of delivering a flow table entry in this embodiment helps reduce overheads of a control channel between the SDN controller and the OpenFlow switch, thereby reducing a congestion risk of the control channel, also helps reduce consumption of network resources of a switching device, and helps meet a requirement of complex networking.

In another embodiment of a flow table management method of the present invention, a flow table management method may include: receiving, by an OpenFlow switch, an OpenFlow protocol message carrying a first flow table entry, where a first field set in the first flow table entry may carry an index of an actual value in the first field set, the first field set includes N fields, and N is a positive integer; obtaining the actual value in the first field set based on the index of the actual value in the first field set; and replacing, with the actual value in the first field set, the index that is of the actual value in the first field set and that is carried in the first field set in the first flow table entry.

First, referring to FIG. 2-a, FIG. 2-a is a schematic flowchart of another flow table management method according to another embodiment of the present invention. As shown in FIG. 2-a, the another flow table management method according to the another embodiment of the present invention may include the following content.

201: An OpenFlow switch receives an OpenFlow protocol message carrying a first flow table entry.

A first field set in the first flow table entry may carry an index of an actual value in the first field set, the first field set includes N fields, and N is a positive integer. N may be, for example, equal to 1, 2, 5, 8, 10, or another value.

The OpenFlow protocol message that carries the first flow table entry may be, for example, a flow_mod message or another OpenFlow protocol message.

An SDN controller may actively deliver a flow table entry to an OpenFlow switch. The SDN controller may deliver, when being instructed by a user or when being triggered by an OpenFlow switch, a flow table entry to the OpenFlow switch. Certainly, the SDN controller may deliver, when being triggered by another condition, a flow table entry to the OpenFlow switch. The first flow table entry carried in the OpenFlow protocol message may be generated by an SDN controller, or the first flow table entry may be obtained by a virtual layer device (or another relay device) by combining multiple flow table entries delivered by an SDN controller or multiple SDN controllers.

The N fields included in the first field set may be any N fields in the first flow table entry. The N fields included in the first field set may be adjacent N fields, partially adjacent N fields or nonadjacent N fields in the first flow table entry. The N fields may, for example, include at least one of the following fields: a port number field, a source IP address field, a destination IP address field, a destination MAC address field, a virtual local area network identifier field, a source MAC address field, a protocol field, or the like.

202: The OpenFlow switch obtains an actual value in the first field set based on an index of the actual value in the first field set.

It may be understood that, the index of the actual value may be of various types, and a requirement may be met as long as the OpenFlow switch can obtain the actual value according to the index of the actual value. In some implementation manners of the present invention, the index of the actual value may be, for example, a flow table entry identifier of a flow table entry stored in the OpenFlow switch, that is, an index carried in any field in the first field set in the first flow table entry carried in the OpenFlow protocol message may be a flow table entry identifier of a flow table entry stored in the OpenFlow switch. It may be understood that, if N is greater than 1, indexes carried in fields in the first field set may be completely the same, partially the same or completely different. For example, the indexes carried in the fields in the first field set may be specifically a same flow table entry identifier. It may be understood that, if an index of an actual value of a field is a flow table entry identifier of a flow table entry already stored in the OpenFlow switch, not only a manner of indexing to the actual value of the field by the OpenFlow switch may be greatly simplified, but also efficiency of indexing to the actual value of the field by the OpenFlow switch may be improved. Moreover, the flow table entry identifier usually has a relatively small data volume, which helps an SDN controller relatively desirably control a data volume of the delivered first flow table entry.

An actual value of a field in the first field set represents a standard value that the field should carry. For example, an actual value of the port number field is a port number, an actual value of the source IP address field is a source IP address, an actual value of the destination IP address field is a destination IP address, an actual value of the destination MAC address field is a destination MAC address, an actual value of the virtual local area network identifier field is a virtual local area network identifier, an actual value of the source MAC address field is a source MAC address, and an actual value of another field is deduced accordingly. In this embodiment of the present invention, a field in the first field set in the first flow table entry delivered by the SDN controller does not carry an actual value of the field, but instead carries an index of the actual value of the field, where the index is information by using which the actual value of the field can be indexed. Assuming that the first field set includes a port number field, the port number field does not carry a port number, but instead carries an index by using which the port number can be indexed. For another example, the first field set includes a source IP address field, and the source IP address field does not carry a source IP address, but instead carries an index by using which the source IP address can be indexed. For another example, the first field set includes a destination IP address field, and the destination IP address field does not carry a destination IP address, but instead carries an index by using which the destination IP address can be indexed. For another example, the first field set includes a virtual local area network identifier field, and the virtual local area network identifier field does not carry a virtual local area network identifier, but instead carries an index by using which the virtual local area network identifier can be indexed. For another example, the first field set includes a destination MAC address field, and the destination MAC address field does not carry a destination MAC address, but instead carries an index by using which the destination MAC address can be indexed. For another example, the first field set includes a source MAC address field, and the source MAC address field does not carry a source MAC address, but instead carries an index by using which the source MAC address can be indexed. If the first field set further includes another protocol field, a related case is deduced accordingly.

In some embodiments of the present invention, if the index is a flow table entry identifier of a flow table entry already stored in the OpenFlow switch, the obtaining the actual value in the first field set based on the index of the actual value in the first field set may include: obtaining, based on the flow table entry identifier, an actual value filled in a third field set that is in the flow table entry represented by the flow table entry identifier and that has a same protocol type as the first field set, where fields that are in the third field set and the first field set and that have a same protocol type have a same actual value. It may be understood that, the third field set and the first field set have equal quantities of fields, and protocol types of the fields included in the third field set and the first field set are in one-to-one correspondences.

203: The OpenFlow switch replaces, with the actual value in the first field set, the index that is of the actual value in the first field set and that is carried in the first field set in the first flow table entry.

Further, the OpenFlow switch may store the first flow table entry obtained after an index that is of an actual value of the first field set and that is carried in the first field set is replaced with the actual value of the first field set, that is, store the first flow table entry obtained after the obtained actual value is filled in the first field set.

In some embodiments of the present invention, the OpenFlow switch may further send the stored first flow table entry or an identifier of the first flow table entry to an SDN controller, so that a stored flow table entry is synchronized between the OpenFlow switch and the SDN controller. Certainly, if the SDN controller also obtains and stores the same first flow table entry according to a method similar to that of the OpenFlow switch, synchronization of the stored flow table entry between the OpenFlow switch and the SDN controller may be implemented. In this case, the OpenFlow switch may not need to send the first flow table entry stored in the SDN controller or the identifier of the first flow table entry to the SDN controller.

In some embodiments of the present invention, before the OpenFlow switch receives the first flow table entry, the method may further include: sending a first packet or a packet header of a first packet to the SDN controller. An Instructions field of the first flow table entry carries a routing instruction set used to process the first packet or an index of a routing instruction set. The method may further include: processing, by the OpenFlow switch, the first packet based on the routing instruction set.

For example, the sending a first packet to the SDN controller may include: sending an OpenFlow protocol message (the OpenFlow protocol message may be, for example, a packet_in message or another OpenFlow protocol message) carrying the first packet to the SDN controller.

In some implementation manners of the present invention, for a same flow table entry, flow table entry identifiers that are in the OpenFlow switch and the SDN controller and that are used to identify the flow table entry may be the same or may have an agreed mapping relationship, and both the OpenFlow switch and the SDN controller may deduce, by using the specified mapping relationship, a flow table entry identifier of the same flow table entry in the peer-end device.

For example, as shown in FIG. 2-*b*, the OpenFlow switch stores a flow table 1, a flow table 2, and a flow table 3, and the like. Each flow table includes multiple flow table entries. Assuming that the first flow table entry is shown in FIG. 2-*c*, the first field set in the first flow table entry includes a switch port field, a MAC src field, and an IP src field. All these fields carry indexes of respective actual values, and the index is an identifier of a flow table entry of the OpenFlow switch. Therefore, the OpenFlow switch may find, based on a flow table entry identifier carried in a switch port field, an already stored flow table entry 1.3, and an actual value of a switch port field of the already stored flow table entry 1.3 is used to replace an index of an actual value carried in the switch port field of the first flow table entry. Similarly, the OpenFlow switch may find, based on a flow table entry identifier carried in a MAC src field, an already stored flow table entry 2.1, and an actual value of a MAC src field of the already stored flow table entry 2.1 may be used to replace an index of an actual value carried in the MAC src field of the first flow table entry. Similarly, the OpenFlow switch may find, based on a flow table entry identifier carried in an IP src field, an already stored flow table entry 3.5, and an actual value of an IP src field of the already stored flow table entry 3.5 is used to replace an index of an actual value carried in the IP src field of the first flow table entry, and so on.

It may be seen that, in this embodiment, for a first flow table entry carried in an OpenFlow protocol message sent by an SDN controller to an OpenFlow switch, because a first field set in the first flow table entry carries an index of an actual value in the first field set, instead of carrying the actual value in the first field set. In a technical implementation, a data volume of an index of an actual value of a field is usually less than or even far less than that of the actual value of the field. Therefore, a mechanism of delivering a flow table entry in this embodiment helps reduce overheads of a control channel between the SDN controller and the OpenFlow switch, thereby reducing a congestion risk of the control channel, also helps reduce consumption of network resources of a switching device, and helps meet a requirement of complex networking.

In an embodiment of a flow table relay method of the present invention, the flow table relay method includes: receiving, by a virtual layer device, a first OpenFlow protocol message from a first SDN controller, where the first OpenFlow protocol message carries a first flow table entry, and a first field in the first flow table entry carries an index of an actual value in the first field; receive a second OpenFlow OpenFlow protocol message from a second SDN controller, where the second OpenFlow protocol message carries a second flow table entry, and a fourth field in the second flow table entry carries an index of an actual value in the fourth field; combine the first flow table entry and the second flow table entry into a third flow table entry; and send a third OpenFlow protocol message carrying the third flow table entry to an OpenFlow switch.

Referring to FIG. 3-*a*, FIG. 3-*a* is a schematic flowchart of another flow table relay method according to another embodiment of the present invention. As shown in FIG. 3-*a*, the another flow table relay method according to the another embodiment of the present invention may include the following content.

301: A virtual layer device receives a first OpenFlow protocol message from a first SDN controller.

The first OpenFlow protocol message carries a first flow table entry, and a first field set in the first flow table entry carries an index of an actual value in the first field set.

The first OpenFlow protocol message carrying the first flow table entry may be, for example, a first flow_mod message or another OpenFlow protocol message.

302: The virtual layer device receives a second OpenFlow protocol message from a second SDN controller.

The second OpenFlow protocol message carries a second flow table entry, and a fourth field set in the second flow table entry carries an index of an actual value of the fourth field set.

The second OpenFlow protocol message carrying the second flow table entry may be, for example, a third flow_mod message or another OpenFlow protocol message.

303: The virtual layer device combines the second flow table entry and the first flow table entry into a third flow table entry.

304: The virtual layer device sends a third OpenFlow protocol message carrying the third flow table entry to an OpenFlow switch.

It may be understood that, each flow table entry has fields of various different protocol types, and each flow table entry has a same quantity of fields, where data filled in fields of a same protocol type in different flow table entries may be the same or different.

The virtual layer device may combine the second flow table entry and the first flow table entry into the third flow table entry by using various manners.

The so-called combining multiple flow table entries mainly refers to combining data filled in fields of a same protocol type in the multiple flow table entries. For example, assuming that the second flow table entry and the second flow table entry both include: a port number field, a source IP address field, a destination IP address field, a destination MAC address field, a virtual local area network identifier field, a source MAC address field, and a field of another protocol type, the virtual layer device may combine data filled in the port number fields of the second flow table entry and the first flow table entry, combine data filled in the source IP address fields of the second flow table entry and the first flow table entry, combine data filled in the destination MAC address fields of the second flow table entry and the first flow table entry, combine data filled in the destination IP address fields of the first flow table entry and the second flow table entry, combine data filled in the virtual local area network identifier fields of the second flow table entry and the first flow table entry, and/or combine data filled in the source MAC address fields of the first flow table entry and the second flow table entry, and a manner of combining data filled in fields of another protocol type may be deduced accordingly.

In some implementation manners of the present invention, the virtual layer device may detect each field of a same protocol type in the second flow table entry and the first flow table entry, where if data filled in fields of a same protocol type in the second flow table entry and the first flow table entry is the same, the same filled data is filled in the field of the same protocol type in the first flow table entry; or if data filled in fields of a same protocol type in the second flow table entry and the first flow table entry is different, the different filled data is filled in a field of the same protocol type in the third flow table entry. In this way, in the third flow table entry, for data filled in fields that are of a same protocol type in the second flow table entry and the first flow table entry and that have same filled data, only one piece of the data is filled in the field of the corresponding same protocol type in the third flow table entry. For filled data of fields that are of a same protocol type in the second flow table entry and the first flow table entry and that have different filled data, the different filled data is filled in the field of the corresponding same protocol type in the third flow table entry. In this way, it can be implemented to some degree that a data volume of the third flow table entry is less than a sum of a data volume of the second flow table entry and a data volume of the first flow table entry.

For example, as shown in FIG. 3-b and FIG. 3-c, the virtual layer device may detect each field of a same protocol type in the second flow table entry and the first flow table entry. For same data filled in fields of a same protocol type in the second flow table entry and the first flow table entry, the same filled data is filled in the fields (fields whose values are A1 to An) of the same protocol type in the first flow table entry. For different data filled in fields (the field whose value is B1 and the field whose value is B2 in FIG. 3-b and FIG. 3-c) of a same protocol type in the second flow table entry and the first flow table entry, the different filled data is filled in a field of the same protocol type in the third flow table entry (as shown in FIG. 3-b). FIG. 3-b and FIG. 3-c show examples of scenarios in which three flow table entries are combined, and a scenario of combining more flow table entries may be divided into solutions, where in each solution two flow table entries are combined. A combination manner may be deduced according to the foregoing manner.

It may be seen that, in this embodiment, for a first flow table entry carried in an OpenFlow protocol message sent by an SDN controller to an OpenFlow switch, a first field set in the first flow table entry carries an index of an actual value in the first field set, instead of carrying the actual value in the first field set. In a technical implementation, a data volume of an index of an actual value of a field is usually less than or even far less than that of the actual value of the field. Therefore, a mechanism of delivering a flow table entry in this embodiment helps reduce overheads of a control channel between the SDN controller and the OpenFlow switch, thereby reducing a congestion risk of the control channel, also helps reduce consumption of network resources of a switching device, and helps meet a requirement of complex networking. Moreover, a virtual layer device between the SDN controller and the OpenFlow switch may further combine several flow table entries. In this way, a data volume of transmitted flow table entries is further reduced.

An embodiment of the present invention further provides another flow table relay method, which may include: receiving, by a virtual layer device, N2 OpenFlow protocol messages from N1 SDN controllers, where the N2 OpenFlow protocol messages carry N3 flow table entries, N2 is a positive integer greater than or equal to N1, N1 is a positive integer, and N3 is a positive integer greater than or equal to N2 and greater than 1; combining the N3 flow table entries into the first flow table entry; and sending an OpenFlow protocol message carrying the first flow table entry to the OpenFlow switch.

The virtual layer device may combine the N3 flow table entries into the first flow table entry by using various feasible manners. The so-called combining multiple flow table entries mainly refers to combining data filled in fields of a same protocol type in the multiple flow table entries. For example, it is assumed that the N3 flow table entries all include: a port number field, a source IP address field, a destination IP address field, a destination MAC address field, a virtual local area network identifier field, a source MAC address field, and a field of another protocol type. The virtual layer device may combine data filled in the port number fields of the N3 flow table entries, combine data filled in the source IP address fields of the N3 flow table entries, combine data filled in the destination MAC address fields of the N3 flow table entries, combine data filled in the destination IP address fields of the N3 flow table entries, combine data filled in the virtual local area network identifier fields of the N3 flow table entries, and/or combine data filled in the source MAC address fields of the N3 flow table entries, and a manner of combining data filled in fields of another protocol type may be deduced accordingly.

In some implementation manners of the present invention, the virtual layer device may detect data filled in fields of a same protocol type in the N3 flow table entries. If the data filled in the fields of a first protocol type in the N3 flow table entries is the same, the data filled in the field of the first protocol type in any flow table entry of the N3 flow table entries is filled in the field of the first protocol type in the first flow table entry. If the data filled in the fields of a first protocol type in the N3 flow table entries is not completely the same, the data filled in the fields of the first protocol type in the N3 flow table entries may be filled in the field of the first protocol type in the first flow table entry, where the first protocol type is any protocol type in the flow table entry. Based on the mechanism of combining flow table entries in such an example, in the first flow table entry, for data filled in fields that are of a same protocol type in the N3 flow table entries and that have same filled data, only one piece of the data is filled in the field of the corresponding same protocol type in the first flow table entry. For data (N3 pieces of filled data in total) filled in fields that are of a same protocol type in the N3 flow table entries and that have filled data that is not completely the same, all the data is filled in the field of the corresponding same protocol type in the first flow table entry. Therefore, N3 pieces of filled data are filled in the field of the same protocol type in the first flow table entry (because deduplication is not performed on the N3 pieces of filled data) in total. Certainly, arrangement locations of the N3 pieces of filled data in the field of the same protocol type in the first flow table entry may be agreed upon by default or may be shown and indicated, to make it convenient for the OpenFlow switch to divide the first flow table entry.

In other implementation manners of the present invention, the virtual layer device may detect data filled in fields of a same protocol type in the N3 flow table entries. If data filled in fields of any same protocol type in the N3 flow table entries is the same, data filled in a field of any protocol type in the first flow table entry is equal to data filled in a field of the any protocol type in any flow table entry of the N3 flow table entries. If data filled in fields of any same protocol type other than the field of the first protocol type is the same, the data filled in the field of any same protocol type other than the field of the first protocol type in the first flow table entry is equal to data filled in a field of the any protocol type other than the first protocol type in the any flow table entry of the N3 flow table entries. The data filled in the field of the first protocol type in the first flow table entry is at least two pieces of filled data obtained after deduplication processing is performed on the data filled in the fields of the first protocol type in the N3 flow table entries. The field of the first protocol type is a field of any protocol type in the flow table entry. Particularly, if the data filled in the fields of the first protocol type in the N3 flow table entries is not completely the same, and the data filled in fields of a second protocol type in the N3 flow table entries is also not completely the same, the virtual layer device also may not execute the foregoing operation of combining the N3 flow table entries into the first flow table entry, where the field of the first protocol type and the field of the second protocol type may be fields of any two protocol types in the N3 flow table entries.

It may be seen that, in this embodiment, for a flow table entry carried in an OpenFlow protocol message delivered by an SDN controller to an OpenFlow switch, a field set in the flow table entry carries an index of an actual value of the field set, instead of carrying the actual value of the field set. In a technical implementation, a data volume of an index of an actual value of a field is usually less than or even far less than that of the actual value of the field. Therefore, such a mechanism helps reduce overheads of a control channel between the SDN controller and the OpenFlow switch, thereby reducing a congestion risk of the control channel, also helps reduce consumption of network resources of a switching device, and helps meet a requirement of complex networking. Moreover, a virtual layer device further combines flow table entries delivered by the SDN controller to obtain a new flow table entry, and sends, to the OpenFlow switch, an OpenFlow protocol message carrying the new flow table entry obtained through combination, so that a total data volume of transmitted flow table entries is further reduced, thereby further reducing a congestion risk of the control channel, further reducing consumption of network resources of a switching device, and better meeting a requirement of complex networking.

To better understand and implement the foregoing solutions in the embodiments of the present invention, description is provided below by using some specific examples.

Referring to FIG. 4, FIG. 4 is a schematic flowchart of a flow table synchronization method according to another embodiment of the present invention. As shown in FIG. 4, the flow table synchronization method according to the another embodiment of the present invention may include the following content.

401: An SDN controller sends a flow table synchronization request (table feature request) message to an OpenFlow switch to request to perform flow table synchronization.

The SDN controller may send, actively or when being triggered by some trigger conditions (the trigger conditions may be, for example, an instruction of a user or system restart), a table feature request message to the OpenFlow switch to request to perform flow table synchronization.

402: The OpenFlow switch sends a flow table synchronization reply (table feature reply) message to the SDN controller.

The table feature reply message may carry all flow table entries currently stored in the OpenFlow switch. Alternatively, the table feature reply message may carry a flow table entry that is stored in the OpenFlow switch and that has changed, where the flow table entry that has changed refers to a flow table entry that has changed as compared with a flow table entry synchronized to the SDN controller a previous time.

403: The SDN controller receives the table feature reply message, and updates, according to a flow table entry carried in the table feature reply message, a flow table database maintained by the SDN controller.

In some embodiments of the present invention, if the flow table entry stored in the OpenFlow switch has changed due to some causes, the OpenFlow switch may actively transfer, to the SDN controller by using the table feature reply message, the flow table entry that is stored in the OpenFlow switch and that has changed, so that the SDN controller updates, according to the flow table entry received from the OpenFlow switch, the flow table database maintained by the SDN controller.

In some implementation manners of the present invention, for a same flow table entry, flow table entry identifiers that are in the OpenFlow switch and the SDN controller and that are used to identify the flow table entry may be the same or may have an agreed mapping relationship, and both the OpenFlow switch and the SDN controller may deduce, by using the specified mapping relationship, a flow table entry identifier of the same flow table entry in the peer-end device.

In some embodiments of the present invention, if each time the SDN controller locally backs up a flow table entry delivered to the OpenFlow switch, the operation of synchronizing a flow table entry between the SDN controller and the OpenFlow switch described in step 401 to step 403 also may not need to be executed.

It may be seen that, based on the manner of synchronizing a flow table between the SDN controller and the OpenFlow switch proposed in this embodiment, synchronization of a flow table between the OpenFlow switch and the SDN controller is implemented.

Referring to FIG. 5, FIG. 5 is a schematic flowchart of another flow table management method according to another embodiment of the present invention. As shown in FIG. 5, the another flow table management method according to the another embodiment of the present invention may include the following content.

501: An OpenFlow switch receives a packet S1.

The packet S1 may be a UDP packet or a TCP packet or an IP packet that is encapsulated by using another protocol. The packet S1 may have an outer IP, an inner IP, and an identifier TEID used to describe a tunnel endpoint. Certainly, the packet S1 may have another layer structure.

502: The OpenFlow switch searches a flow table to determine whether a flow table entry matching the packet S1 exists.

If yes, execute step 503.

If not, execute step 504.

503: The OpenFlow switch processes the packet S1 based on a routing instruction set carried in an Instructions field in the found flow table entry matching the packet S1.

504: The OpenFlow switch sends a packet_in message carrying the packet S1 to an SDN controller, to request the SDN controller to deliver a corresponding flow table entry.

The packet_in message is an OpenFlow protocol message.

505: The SDN controller receives the packet_in message sent by the OpenFlow switch, and may determine, according to a preset processing policy, the routing instruction set corresponding to the packet S1.

The routing instruction set of the packet S1 that is determined by the SDN controller according to the preset processing policy may include multiple instructions for processing the packet S1. For example, the routing instruction set includes an instruction instructing the OpenFlow switch to forward the packet S1 based on MAC, an instruction instructing the OpenFlow switch to route the packet S1 based on IP, an instruction instructing the OpenFlow switch to perform GTP tunnel encapsulation on the packet S1, an instruction instructing the OpenFlow switch to perform GTP tunnel decapsulation on the packet S1, and the like.

506: The SDN controller generates a first flow table entry, and sends, to the OpenFlow switch, a flow_mod message that is used to respond to the packet_in message and that carries the first flow table entry.

The flow_mod message is an OpenFlow protocol message.

A first field set in the first flow table entry carries an index of an actual value in the first field set, the first field set includes N fields, and N is a positive integer. The Instructions field of the first flow table entry may be one field in the first field set, and certainly, the Instructions field also may not belong to the first field set. For example, the instructions Instructions field of the first flow table entry carries the routing instruction set or an index of the routing instruction set (where the index may be, for example, a flow table entry identifier of a flow table entry stored in the OpenFlow switch).

N in the embodiments of the present invention may be, for example, equal to 1, 2, 5, 8, 10, or another value.

The N fields included in the first field set may be any N fields in the first flow table entry. For example, the N fields may include one or more of the following fields: a protocol field, a source IP address field, a destination IP address field, a destination MAC address field, a source MAC address field, a port number field, a virtual local area network identifier field, or the like.

In some implementation manners of the present invention, the index may be the flow table entry identifier of the flow table entry already stored in the OpenFlow switch. That is, an index carried in any field in the first field set in the first flow table entry carried in the flow_mod message may be a flow table entry identifier of a flow table entry stored in the OpenFlow switch. It may be understood that, if N is greater than 1, indexes carried in fields in the first field set may be completely the same, partially the same or completely different.

507: After receiving the flow_mod message, the OpenFlow switch obtains an actual value of a first field set based on an index in the first field set, and fills the obtained actual value of the first field set in the first field set in the first flow table entry; and the OpenFlow switch stores the first flow table entry in which the actual value is filled in the first field set.

The OpenFlow switch fills actual values for fields that are in the first flow table entry carried in the flow_mod message and that are not filled with actual values, and the OpenFlow switch stores the first flow table in which actual values have been filled in all fields that are not filled with actual values.

Assuming that the index carried in the first field set is a flow table entry identifier, the OpenFlow switch may obtain, based on the flow table entry identifier, an actual value filled in a third field set that is in the flow table entry represented by the flow table entry identifier and that has a same protocol type as the first field set, where fields that are in the third field set and the first field set and that have a same protocol type have a same actual value.

508: The OpenFlow switch processes a first packet S1 based on the routing instruction set that is carried in the Instructions field of the first flow table entry and that is used to process the packet S1.

It may be seen that, in this embodiment, for a first flow table entry carried in a flow_mod message sent by an SDN controller to an OpenFlow switch, a first field set in the first flow table entry carries an index of an actual value in the first field set, instead of carrying the actual value in the first field set. In a technical implementation, a data volume of an index of an actual value of a field is usually less than or even far less than that of the actual value of the field. Therefore, a mechanism provided in this embodiment helps reduce overheads of a control channel between the SDN controller and the OpenFlow switch, thereby reducing a congestion risk of the control channel, and helps reduce consumption of computation resources of the OpenFlow switch.

Figure 6:
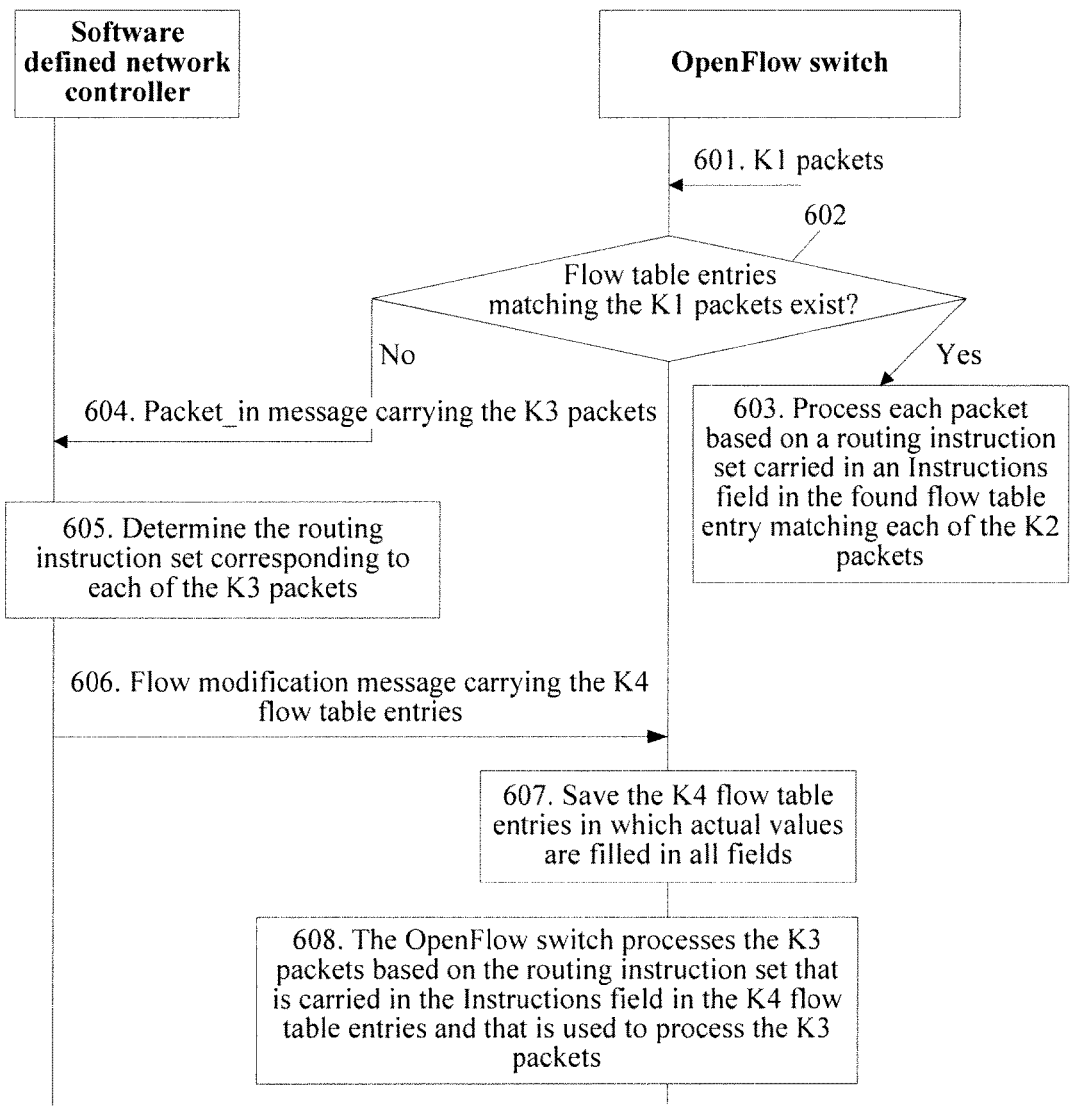
FIG. 6 is a schematic flowchart of another flow table management method according to an embodiment of the present invention.

Referring to FIG. 6, FIG. 6 is a schematic flowchart of another flow table management method according to another embodiment of the present invention. As shown in FIG. 6, the another flow table management method according to the another embodiment of the present invention may include the following content.

601: An OpenFlow switch receives K1 packets.

K1 is a positive integer greater than 1. The K1 packets may be UDP packets or TCP packets or IP packets encapsulated by using another protocol, and some or all of the K1 packets may have outer IPs, inner IPs, and an identifier TEID used to describe a tunnel endpoint. Certainly, some or all of the K1 packets may have another layer structure.

The K1 packets may be received by the OpenFlow switch within a specified time, and the specified time may be one second, two seconds, five seconds, or another time.

602: The OpenFlow switch searches a flow table to determine whether a flow table entry matching each of the K1 packets exists.

In this embodiment, it is assumed that the OpenFlow switch finds that a flow table entry matching each of K2 packets of the K1 packets exists in the flow table, but the OpenFlow switch does not find a flow table entry matching each of K3 packets of the K1 packets in the flow table.

K1=K2+K3, where it is assumed that K2 is a positive integer, and K3 is a positive integer greater than 1.

603: The OpenFlow switch processes each packet based on a routing instruction set carried in an Instructions field in the found flow table entry matching each of the K2 packets.

604: The OpenFlow switch sends a packet_in message carrying the K3 packets to an SDN controller, to request the SDN controller to deliver a corresponding flow table entry.

The packet_in message is an OpenFlow protocol message.

605: The SDN controller receives the packet_in message sent by the OpenFlow switch, and may determine, according to a preset processing policy, the routing instruction set corresponding to each of the K3 packets.

The routing instruction set of each of the K3 packets that is determined by the SDN controller according to a preset processing policy may include multiple instructions for processing the packet. Routing instruction sets that are determined by the SDN controller and that correspond to some or all of the K3 packets may be the same. Certainly, routing instruction sets that are determined by the SDN controller and that correspond to all the K3 packets may be different.

606: The SDN controller generates K4 flow table entries, and sends, to the OpenFlow switch, a flow_mod message that is used to respond to the packet_in message and that carries the K4 flow table entries.

The flow_mod message is an OpenFlow protocol message.

A first field set of a first flow table entry of the K4 flow table entries carries an index of an actual value in the first field set, the first field set may include N fields, and N is a positive integer. The Instructions field of the first flow table entry may be one field in the first field set, and certainly, the Instructions field also may not belong to the first field set. For example, the instructions Instructions field of the first flow table entry carries the routing instruction set or an index of the routing instruction set (the index may be, for example, a flow table entry identifier of a flow table entry already stored in the OpenFlow switch).

N in this embodiment of the present invention may be, for example, equal to 1, 2, 5, 8, 10, or another value.

The first flow table entry may be any flow table entry of the K4 flow table entries. The N fields included in the first field set may be any N fields in the first flow table entry. For example, the N fields may include one or more of the following fields: a protocol field, a source IP address field, a destination IP address field, a destination MAC address field, a source MAC address field, a port number field, a virtual local area network identifier field, or the like.

In some implementation manners of the present invention, the index may be a flow table entry identifier of a flow table entry already stored in the OpenFlow switch. That is, an index carried in any field in the first field set in the first flow table entry carried in the flow_mod message may be a flow table entry identifier of a flow table entry stored in the OpenFlow switch. It may be understood that, if N is greater than 1, indexes carried in fields in the first field set may be completely the same, partially the same or completely different.

It may be understood that, the first field set of at least one flow table entry including the first flow table entry of the K4 flow table entries may carry an index of an actual value in the first field set, so as to reduce a data volume of the K4 flow table entries carried in the flow_mod message.

607: After the OpenFlow switch receives the flow_mod message, the OpenFlow switch may fill actual values in fields that are in the K4 flow table entries carried in the flow_mod message and that are not filled with actual values, and the OpenFlow switch stores the K4 flow table entries in which actual values are filled in all the fields.

Assuming that the index carried in the first field set is a flow table entry identifier, the OpenFlow switch may obtain, based on the flow table entry identifier, an actual value filled in a third field set that is in the flow table entry represented by the flow table entry identifier and that has a same protocol type as the first field set, where fields that are in the third field set and the first field set and that have a same protocol type have a same actual value.

608: The OpenFlow switch processes each packet based on the routing instruction set that matches each of the K3 packets and that is carried in the Instructions field in the flow table entry.

It may be seen that, in this embodiment, for K4 flow table entries carried in a flow_mod message sent by an SDN controller to an OpenFlow switch, a first field set in at least one flow table entry of the K4 flow table entries carries an index of an actual value in the first field set, instead of carrying the actual value in the first field set. In a technical implementation, a data volume of an index of an actual value of a field is usually less than or even far less than that of the actual value of the field. Therefore, a mechanism provided in this embodiment helps reduce overheads of a control channel between the SDN controller and the OpenFlow switch, thereby reducing a congestion risk of the control channel, and also helps reduce consumption of computation resources of the OpenFlow switch.

Figure 7:
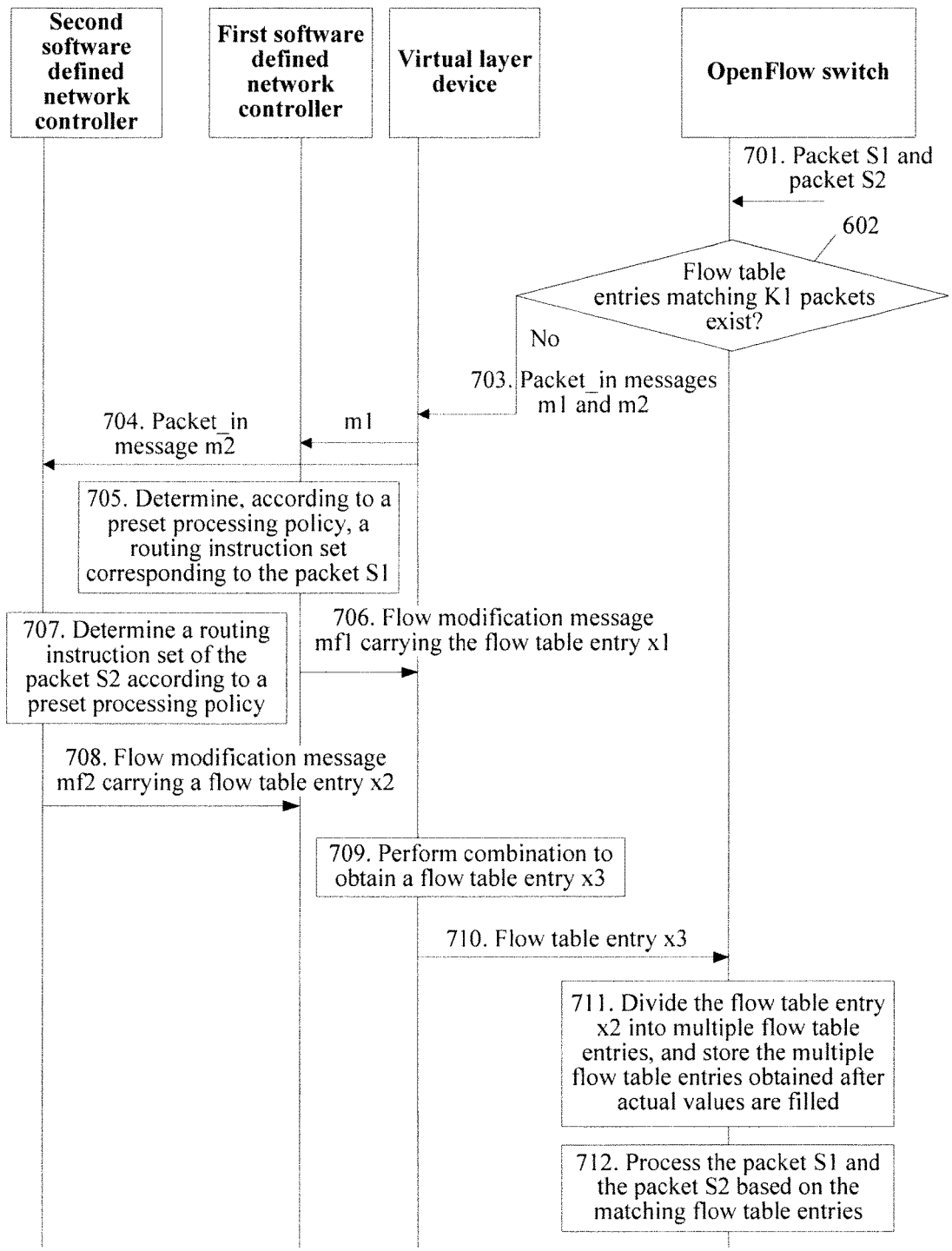
FIG. 7 is a schematic flowchart of another flow table management method according to an embodiment of the present invention.

Referring to FIG. 7, FIG. 7 is a schematic flowchart of another flow table management method according to another embodiment of the present invention. As shown in FIG. 7, the another flow table management method according to the another embodiment of the present invention may include the following content.

701: An OpenFlow switch receives a packet S1 and a packet S2.

The packet S1 and the packet S2 may be UDP packets or TCP packets or IP packets encapsulated by using another protocol. The packet S1 and the packet S2 may have outer IPs, inner IPs, and an identifier TEID used to describe tunnel endpoint. Certainly, the packet S1 and the packet S2 may have another layer structure.

The K1 packets may be received by the OpenFlow switch within a specified time, and the specified time may be one second, two seconds, five seconds, or another time.

702: The OpenFlow switch may search a flow table to determine whether flow table entries matching the packet S1 and the packet S2 exist.

In this embodiment, it is assumed that the OpenFlow switch does not find a flow table entry matching the packet S1 in the flow table, and the OpenFlow switch does not find a flow table entry matching the packet S2 in the flow table either.

703: The OpenFlow switch sends a packet_in message m1 carrying the packet S1 to a first SDN controller, to request the SDN controller to deliver a corresponding flow table entry, and the OpenFlow switch sends a packet_in message m2 carrying the packet S2 to a second SDN controller, to request the SDN controller to deliver a corresponding flow table entry.

The packet_in message m1 and the packet_in message m2 are OpenFlow protocol messages.

704: A virtual layer device receives the packet_in message m1 and the packet_in message m2, and forwards the packet_in message m1 to the first SDN controller; and the virtual layer device forwards the packet_in message m2 to the second SDN controller.

705: The first SDN controller receives the packet_in message m1, and determines, according to a preset processing policy, a routing instruction set corresponding to the packet S1.

The routing instruction set of the packet S1 that is determined by the first SDN controller according to the preset processing policy may include multiple instructions for processing the packet S1. For example, the routing instruction set includes an instruction instructing the OpenFlow switch to forward the packet S1 based on MAC, an instruction instructing the OpenFlow switch to route the packet S1 based on IP, an instruction instructing the OpenFlow switch to perform GTP tunnel encapsulation on the packet S1, an instruction instructing the OpenFlow switch to perform GTP tunnel decapsulation on the packet S1, and the like.

706: The first SDN controller generates a flow table entry x1, and sends, to the OpenFlow switch, a flow_mod message mf1 that is used to respond to the packet_in message m1 and that carries the flow table entry x1.

The flow_mod message mf1 is an OpenFlow protocol message.

A field set c1 of the flow table entry x1 carries an index of an actual value of the field set c1, where the field set c1 includes Nn1 fields, and Nn1 is a positive integer. An Instructions field of the flow table entry x1 may be one field in the field set c1. Certainly, the Instructions field also may not belong to the field set c1. For example, the instructions Instructions field of the flow table entry x1 carries the routing instruction set or an index of the routing instruction set (where the index may be, for example, a flow table entry identifier of a flow table entry stored in the OpenFlow switch).

Nn1 in this embodiment of the present invention may be, for example, equal to 1, 2, 5, 8, 10, or another value.

The Nn1 fields included in the field set c1 may be any Nn1 fields in the flow table entry x1. For example, the Nn1 fields may include one or more of the following fields: a protocol field, a source IP address field, a destination IP address field, a destination MAC address field, a source MAC address field, a port number field, a virtual local area network identifier field, or the like.

In some implementation manners of the present invention, the index may be a flow table entry identifier of a flow table entry stored in the OpenFlow switch. That is, an index carried in any field in the field set c1 in the flow table entry x1 carried in the flow_mod message may be a flow table entry identifier of a flow table entry stored in the OpenFlow switch. It may be understood that, for example, if Nn1 is greater than 1, the index carried in fields in the field set c1 may be completely the same, partially the same or completely different.

707: The second SDN controller receives the packet_in message m2, and determines a routing instruction set of the packet S2 according to a preset processing policy.

The routing instruction set of the packet S2 that is determined by the second SDN controller according to the preset processing policy may include multiple instructions for processing the packet S2. For example, the routing instruction set includes an instruction instructing the OpenFlow switch to forward the packet S2 based on MAC, an instruction instructing the OpenFlow switch to route the packet S2 based on IP, an instruction instructing the OpenFlow switch to perform GTP tunnel encapsulation on the packet S2, an instruction instructing the OpenFlow switch to perform GTP tunnel decapsulation on the packet S2, and the like.

708: The second SDN controller generates a flow table entry x2, and sends, to the OpenFlow switch, a flow_mod message mf2 that is used to respond to the packet_in message m2 and that carries the flow table entry x2.

The flow_mod message mf2 is an OpenFlow protocol message.

A field set c2 in the flow table entry x2 carries an index of an actual value of the field set c2, where the field set c2 includes Nn2 fields, and Nn2 is a positive integer. An Instructions field of the flow table entry x2 may be one field in the field set c2. Certainly, the Instructions field may not belong to the field set c2. For example, the instruction Instructions field of the flow table entry x2 carries the routing instruction set or an index of the routing instruction set (the index may be, for example, a flow table entry identifier of a flow table entry stored in the OpenFlow switch).

Nn2 in this embodiment of the present invention may be, for example, equal to 1, 2, 5, 8, 10, or another value.

The Nn2 fields included in the field set c2 may be any Nn2 fields in the flow table entry x2. For example, the Nn2 fields may include one or more of the following fields: a protocol field, a source IP address field, a destination IP address field, a destination MAC address field, a source MAC address field, a port number field, a virtual local area network identifier field, or the like.

In some implementation manners of the present invention, the index may be a flow table entry identifier of a flow table entry stored in the OpenFlow switch. That is, an index carried in any field in the field set c2 in the flow table entry x2 carried in the flow_mod message may be a flow table entry identifier of a flow table entry stored in the OpenFlow switch. It may be understood that, for example, if Nn2 is greater than 1, indexes carried in fields in the field set c2 may be completely the same, partially the same or completely different.

709: The virtual layer device receives the flow_mod message mf1 and the flow_mod message mf2, and combines the flow table entry x1 carried in the flow_mod message mf1 and the flow table entry x2 carried in the flow_mod message mfg to obtain a flow table entry x3.

In some implementation manners of the present invention, there may be various types of manners of combining the flow table entry x1 and the flow table entry x2 into the flow table entry x3. For example, the virtual layer device may detect data filled in fields of each same protocol type in the flow table entry x1 and the flow table entry x2. If data filled in fields of a same protocol type in the flow table entry x1 and the flow table entry x2 is the same, one piece of the same filled data is filled in a field of the same protocol type in the flow table entry x3. If data filled in fields of a same protocol type in the flow table entry x1 and the flow table entry x2 is different, the different filled data is filled in a field of the corresponding same protocol type in the flow table entry x3 (for example, as shown in the example in FIG. 7-c).

For example, referring to FIG. 3-b and FIG. 3-c, FIG. 3-b shows an example of a scenario in which two flow table entries are combined into one flow table entry. FIG. 3-c shows an example of a scenario in which three flow table entries are combined into one flow table entry. A scenario in which more flow table entries are combined may be deduced accordingly.

710: The virtual layer device sends a flow_mod message mf3 carrying the flow table entry x3 to the OpenFlow switch.

711: After receiving the foregoing flow_mod message mf3, the OpenFlow switch divides the flow table entry x2 into multiple flow table entries (each field of each flow table entry obtained through division has only an actual value or an index of an actual value), the OpenFlow switch fills actual values (the actual values may be obtained according to corresponding indexes) in fields that are not filled with actual values in the multiple flow table entries obtained through division, and the OpenFlow switch stores the multiple flow table entries obtained after actual values are filled in all the fields.

712: The OpenFlow switch processes the packet S1 based on the routing instruction set carried in the Instructions field in the flow table entry matching the packet S1, and similarly, the OpenFlow switch processes the packet S2 based on the routing instruction set carried in the Instructions field in the flow table entry matching the packet S2.

It may be seen that, in this embodiment, for K4 flow table entries carried in a flow_mod message sent by an SDN controller to an OpenFlow switch, a first field set in at least one flow table entry of the K4 flow table entries carries an index of an actual value in the first field set, instead of carrying the actual value in the first field set. In a technical implementation, a data volume of an index of an actual value of a field is usually less than or even far less than that of the actual value of the field. Therefore, a mechanism provided in this embodiment helps reduce overheads of a control channel between the SDN controller and the OpenFlow switch, thereby reducing a congestion risk of the control channel, and also helps reduce consumption of computation resources of the OpenFlow switch.

Referring to FIG. 8-a, an embodiment of the present invention further provides a software defined network controller 800, which may include a generation unit 810 and a sending unit 820.

The generation unit 810 is configured to generate a first flow table entry, where a first field set in the first flow table entry carries an index of an actual value in the first field set, the first field set includes N fields, and N is a positive integer.

The generation unit 810 may generate the first flow table entry based on a preset policy, and the generation unit 810 may generate the first flow table entry when being instructed by a user or when being triggered by an OpenFlow switch. Certainly, the generation unit 810 may generate one or more flow table entries when being triggered by another condition.

The sending unit 820 is configured to send an OpenFlow protocol message to an OpenFlow switch, where the OpenFlow protocol message carries the first flow table entry.

The OpenFlow protocol message that carries the first flow table entry may be, for example, a flow_mod message or another OpenFlow protocol message.

In some embodiments of the present invention, the index is a flow table entry identifier of a flow table entry stored in the switch.

It may be understood that, the first flow table entry may have a data structure that is the same as that of a standard flow table entry. For example, a type of a protocol field included in the first flow table entry and a location relationship between all types of protocol fields in the first flow table entry may be the same as those in the standard flow table entry. However, a type of information carried in some or all of the protocol fields in the first flow table entry is different from that in the standard flow table entry. Specifically, a field in the first field set in the first flow table entry carries an index of an actual value of the field, while each field in the standard flow table entry carries an actual value of the field.

N in the embodiments of the present invention may be, for example, equal to 1, 2, 5, 8, 10, or another value.

The N fields included in the first field set may be any N fields in the first flow table entry. The N fields included in the first field set may be adjacent N fields, partially adjacent N fields or nonadjacent N fields in the first flow table entry, that is, locations where fields in the first field set may be arbitrarily distributed in the first flow table entry, which helps more flexibly meet flexible requirements of various actual application scenarios. The N fields may, for example, include at least one of the following fields: a port number field, a source IP address field, a destination IP address field, a destination MAC address field, a virtual local area network identifier field, a source MAC address field, or the like. An actual value of a field in the first field set represents a standard value that the field should carry. For example, an actual value of the port number field is a port number, an actual value of the source IP address field is a source IP address, an actual value of the destination IP address field is a destination IP address, an actual value of the destination MAC address field is a destination MAC address, an actual value of the virtual local area network identifier field is a virtual local area network identifier, an actual value of the source MAC address field is a source MAC address, and an actual value of another field is deduced accordingly. In this embodiment of the present invention, a field in the first field set in the first flow table entry delivered by the SDN controller 800 does not carry an actual value of the field, but instead carries an index of the actual value of the field, where the index is information by using which the actual value of the field can be indexed. Assuming that the first field set includes a port number field, the port number field does not carry a port number, but instead carries an index by using which the port number can be indexed. For another example, the first field set includes a source IP address field, and the source IP address field does not carry a source IP address, but instead carries an index by using which the source IP address can be indexed. For another example, the first field set includes a destination IP address field, and the destination IP address field does not carry a destination IP address, but instead carries an index by using which the destination IP address can be indexed. For another example, the first field set includes a virtual local area network identifier field, and the virtual local area network identifier field does not carry a virtual local area network identifier, but instead carries an index by using which the virtual local area network identifier can be indexed. For another example, the first field set includes a destination MAC address field, and the destination MAC address field does not carry a destination MAC address, but instead carries an index by using which the destination MAC address can be indexed. For another example, the first field set includes a source MAC address field, and the source MAC address field does not carry a source MAC address, but instead carries an index by using which the source MAC address can be indexed. If the first field set further includes another protocol field, a related case is deduced accordingly.

It may be understood that, the index of the actual value may be of various types, and a requirement may be met as long as the OpenFlow switch can obtain the actual value according to the index of the actual value. In some implementation manners of the present invention, the index of the actual value may be, for example, a flow table entry identifier of a flow table entry already stored in the OpenFlow switch, that is, an index carried in any field in the first field set in the first flow table entry carried in the OpenFlow protocol message may be a flow table entry identifier of a flow table entry stored in the OpenFlow switch. It may be understood that, if N is greater than 1, indexes carried in fields in the first field set may be completely the same, partially the same or completely different (for example, the indexes carried in the fields in the first field set may be specifically a same flow table entry identifier). It may be understood that, if an index of an actual value of a field is a flow table entry identifier of a flow table entry already stored in the OpenFlow switch, not only a manner of indexing to the actual value of the field by the OpenFlow switch may be greatly simplified, but also efficiency of indexing to the actual value of the field by the OpenFlow switch may be improved. Moreover, the flow table entry identifier usually has a relatively small data volume, which helps the SDN controller 800 to relatively desirably control a data volume of the delivered first flow table entry.

In some implementation manners of the present invention, each field in a second field set in the first flow table entry may further carry multiple actual values of the field. The second field set includes M fields, and M is a positive integer. Examples of the actual values of the fields are described above. It may be understood that, because each field in the second field set may further carry multiple actual values of the field, it equivalently indicates that the first flow table entry may be divided into multiple flow table entries, which also helps the SDN controller 800 to relatively desirably control a data volume of the delivered first flow table entry. For example, the second field set in the first flow table entry includes a destination MAC address field, and the destination MAC address field carries three destination MAC addresses (for example, information carried in the destination MAC address field is as follows: 192.168.0.2, 192.168.0.3, and 192.168.0.4, or information carried in the destination MAC address field is as follows: 192.168.0.2 to 192.168.0.4, and two manners in the foregoing examples may both represent that the destination MAC address field carries three destination MAC addresses; certainly, it may be represented in another manner that the destination MAC address field carries three MAC addresses). In this scenario, the OpenFlow switch may divide the first flow table entry into four flow table entries. Destination MAC address fields of the three flow table entries respectively carry a different one of the foregoing three destination MAC addresses, and other fields of the three flow table entries are the same. Certainly, if another field of the three flow table entries also carries multiple actual values, the three flow table entries may be respectively divided according to a similar manner. For example, a virtual local area network identifier field of the three flow table entries that is obtained through division carries two virtual local area network identifiers, each flow table entry of the three flow table entries may be further divided into two flow table entries. A specific division manner may be shown in FIG. 1-*i* and FIG. 1-*j*. Division may stop only when each field of an obtained flow table entry carries only one actual value or an index of one actual value of the field.

M in the embodiments of the present invention may be, for example, equal to 1, 2, 5, 8, 10, or another value.

The M fields included in the second field set in the first flow table entry may be any M fields that are in the first flow table entry and that are different from any field in the first field set. The M fields included in the second field set may be adjacent M fields, partially adjacent M fields or nonadjacent M fields in the first flow table entry. The M fields may include, for example, at least one of the following fields: a port number field, a source IP address field, a destination IP address field, a destination MAC address field, a virtual local area network identifier field, a source MAC address field, a protocol field, or the like.

An intersection of the second field set and the first field set is an empty set.

As shown in FIG. 8-*b*, in some embodiments of the present invention, the SDN controller further includes a receiving unit 830, configured to: before the generation unit 810 generates the first flow table entry, receive a first packet or a packet header of a first packet from a switch, and determine, according to a preset processing policy, a routing instruction set used to process the first packet, where an instruction field of the first flow table entry carries the routing instruction set or an index of the routing instruction set.

For example, the receiving a first packet or a packet of a first packet from the OpenFlow switch may, for example, include: receiving an OpenFlow protocol message (the OpenFlow protocol message is, for example, a packet_in (packet_in) message or another OpenFlow protocol message) carrying the first packet or the packet header of the first packet from the OpenFlow switch. Certainly, the OpenFlow protocol message may further carry one or more other packets or packet headers. Certainly, the OpenFlow protocol message may further carry other information.

In some implementation manners of the present invention, for a same flow table entry, flow table entry identifiers that are in the OpenFlow switch and the SDN controller 800 and that are used to identify a same flow table entry may be the same or may have an agreed mapping relationship. If flow table entry identifiers that have a specified mapping relationship are used in the OpenFlow switch and the SDN controller 800 to identify a same flow table entry, the OpenFlow switch and the SDN controller 800 may both deduce, by using the specified mapping relationship, a flow table entry identifier of the same flow table entry in the peer end device.

It can be understood that, functions of functional modules of the SDN controller 800 in this embodiment may be specifically implemented according to the method in the foregoing method embodiment. For specific implementation processes of the functions, reference may be made to the related description of the foregoing method embodiment, and details are no longer described herein.

It may be seen that, in the solution in this embodiment, for a first flow table entry carried in an OpenFlow protocol message sent by an SDN controller 800 to an OpenFlow switch, a first field set in the first flow table entry carries an index of an actual value in the first field set, instead of carrying the actual value in the first field set. In a technical implementation, a data volume of an index of an actual value of a field is usually less than or even far less than that of the actual value of the field. Therefore, a mechanism of delivering a flow table entry in this embodiment helps reduce overheads of a control channel between the SDN controller 800 and the OpenFlow switch, thereby reducing a congestion risk of the control channel, also helps reduce consumption of network resources of a switching device, and helps meet a requirement of complex networking.

Referring to FIG. 9-a, an embodiment of the present invention further provides an OpenFlow switch 900, which may include: a receiving unit 910, an obtaining unit 920, and a replacement unit 930.

The receiving unit 910 is configured to receive an OpenFlow protocol message, where the OpenFlow protocol message carries a first flow table entry, a first field set in the first flow table entry carries an index of an actual value in the first field set, the first field set includes N fields, and N is a positive integer.

The OpenFlow protocol message that carries the first flow table entry may be, for example, a flow_mod message or another OpenFlow protocol message.

The N fields included in the first field set may be any N fields in the first flow table entry. The N fields included in the first field set may be adjacent N fields, partially adjacent N fields or nonadjacent N fields in the first flow table entry. The N fields may, for example, include at least one of the following fields: a port number field, a source IP address field, a destination IP address field, a destination MAC address field, a virtual local area network identifier field, a source MAC address field, a protocol field, or the like.

The obtaining unit 920 is configured to obtain the actual value in the first field set based on the index of the actual value in the first field set.

The replacement unit 930 is configured to replace, with the actual value of the first field set that is obtained by the obtaining unit 920, the index that is of the actual value in the first field set and that is carried in the first field set in the first flow table entry.

It may be understood that, the index of the actual value may be of various types, and a requirement may be met as long as the OpenFlow switch can obtain the actual value according to the index of the actual value. In some implementation manners of the present invention, the index of the actual value may be, for example, a flow table entry identifier of a flow table entry already stored in the OpenFlow switch 900, that is, an index carried in any field in the first field set in the first flow table entry carried in the OpenFlow protocol message may be a flow table entry identifier of a flow table entry stored in the OpenFlow switch. It may be understood that, if N is greater than 1, indexes carried in fields in the first field set may be completely the same, partially the same or completely different. For example, the indexes carried in the fields in the first field set may be specifically a same flow table entry identifier. It may be understood that, if an index of an actual value of a field is a flow table entry identifier of a flow table entry already stored in the OpenFlow switch, not only a manner of indexing to the actual value of the field by the OpenFlow switch may be greatly simplified, but also efficiency of indexing to the actual value of the field by the OpenFlow switch may be improved. Moreover, the flow table entry identifier usually has a relatively small data volume, which helps an SDN controller relatively desirably control a data volume of the delivered first flow table entry.

An actual value of a field in the first field set represents a standard value that the field should carry. For example, an actual value of the port number field is a port number, an actual value of the source IP address field is a source IP address, an actual value of the destination IP address field is a destination IP address, an actual value of the destination MAC address field is a destination MAC address, an actual value of the virtual local area network identifier field is a virtual local area network identifier, an actual value of the source MAC address field is a source MAC address, and an actual value of another field is deduced accordingly. In this embodiment of the present invention, a field in the first field set in the first flow table entry delivered by the SDN controller does not carry an actual value of the field, but instead carries an index of the actual value of the field, where the index is information by using which the actual value of the field can be indexed. Assuming that the first field set includes a port number field, the port number field does not carry a port number, but instead carries an index by using which the port number can be indexed. For another example, the first field set includes a source IP address field, and the source IP address field does not carry a source IP address, but instead carries an index by using which the source IP address can be indexed. For another example, the first field set includes a destination IP address field, and the destination IP address field does not carry a destination IP address, but instead carries an index by using which the destination IP address can be indexed. For another example, the first field set includes a virtual local area network identifier field, and the virtual local area network identifier field does not carry a virtual local area network identifier, but instead carries an index by using which the virtual local area network identifier can be indexed. For another example, the first field set includes a destination MAC address field, and the destination MAC address field does not carry a destination MAC address, but instead carries an index by using which the destination MAC address can be indexed. For another example, the first field set includes a source MAC address field, and the source MAC address field does not carry a source MAC address, but instead carries an index by using which the source MAC address can be indexed. If the first field set further includes another protocol field, a related case is deduced accordingly.

In some embodiments of the present invention, if the index is a flow table entry identifier of a flow table entry stored in the switch, the the obtaining unit 920 is specifically configured to obtain, based on the flow table entry identifier, an actual value filled in a third field set that is in the flow table entry represented by the flow table entry identifier and that has a same protocol type as the first field set, where fields that are in the third field set and the first field set and that have a same protocol type have a same actual value.

As shown in FIG. 9-b, in some embodiments of the present invention, the OpenFlow switch 900 further includes: a first sending unit 940, configured to send the stored first flow table entry or an identifier of the first flow table entry to a software defined network controller.

As shown in FIG. 9-c, in some embodiments of the present invention, the OpenFlow switch 900 may further include: a second sending unit 950, configured to: before the first flow table entry is received, send a first packet or a packet header of a first packet to the software defined network controller, where an instruction field of the first flow table entry carries a routing instruction set used to process the first packet or an index of a routing instruction set; and a packet processing unit 960, configured to process the first packet based on the routing instruction set.

In some implementation manners of the present invention, for a same flow table entry, flow table entry identifiers used to identify the flow table entry in the OpenFlow switch 900 and the SDN controller may be the same or may have an agreed mapping relationship. Both the OpenFlow switch 900 and the SDN controller may deduce, by using the specified mapping relationship, a flow table entry identifier of the same flow table entry in the peer end device.

It can be understood that, functions of functional modules of the OpenFlow switch 900 in this embodiment may be specifically implemented according to the method in the foregoing method embodiment. For specific implementation processes of the functions, reference may be made to the related description of the foregoing method embodiment, and details are no longer described herein.

It may be seen that, in this embodiment, for a first flow table entry carried in an OpenFlow protocol message sent by an SDN controller to the OpenFlow switch 900, because a first field set in the first flow table entry carries an index of an actual value, instead of carrying the actual value in the first field set. In a technical implementation, a data volume of an index of an actual value of a field is usually less than or even far less than that of the actual value of the field. Therefore, a mechanism of delivering a flow table entry in this embodiment helps reduce overheads of a control channel between the SDN controller and the OpenFlow switch 900, thereby reducing a congestion risk of the control channel, also helps reduce consumption of network resources of the OpenFlow switch 900, and helps meet a requirement of complex networking.

Figure 10:
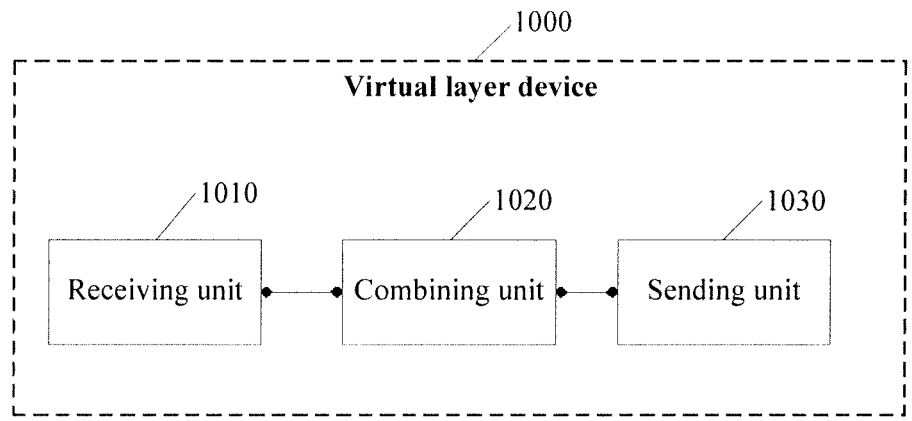
FIG. 10 is a schematic structural diagram of a virtual layer device according to an embodiment of the present invention.

Referring to FIG. 10, an embodiment of the present invention further provides a virtual layer device 1000, which may include: a receiving unit 1010, a combining unit 1020, and a sending unit 1030.

The receiving unit 1010 is configured to receive a first OpenFlow protocol message from a first software defined network controller, where the first OpenFlow protocol message carries a first flow table entry, and a first field in the first flow table entry carries an index of an actual value in the first field; and receive a second OpenFlow OpenFlow protocol message from a second software defined network controller, where the second OpenFlow protocol message carries a second flow table entry, and a fourth field in the second flow table entry carries an index of an actual value in the fourth field.

The combining unit 1020 is configured to combine the first flow table entry and the second flow table entry into a third flow table entry.

The sending unit 1030 is configured to send a third OpenFlow protocol message carrying the third flow table entry to an OpenFlow switch.

It may be understood that, each flow table entry has fields of various different protocol types, and each flow table entry has a same quantity of fields, where data filled in fields of a same protocol type in different flow table entries may be the same or different.

The virtual layer device may combine the second flow table entry and the first flow table entry into the third flow table entry by using various manners.

The so-called combining multiple flow table entries mainly refers to combining data filled in fields of a same protocol type in the multiple flow table entries. For example, assuming that the second flow table entry and the second flow table entry both include: a port number field, a source IP address field, a destination IP address field, a destination MAC address field, a virtual local area network identifier field, a source MAC address field, and a field of another protocol type, the combining unit 1020 may combine data filled in the port number fields of the second flow table entry and the first flow table entry, combine data filled in the source IP address fields of the second flow table entry and the first flow table entry, combine data filled in the destination MAC address fields of the second flow table entry and the first flow table entry, combine data filled in the destination IP address fields of the first flow table entry and the second flow table entry, combine data filled in the virtual local area network identifier fields of the second flow table entry and the first flow table entry, and/or combine data filled in the source MAC address fields of the first flow table entry and the second flow table entry, and a manner of combining data filled in fields of another protocol type may be deduced accordingly.

In some implementation manners of the present invention, the combining unit 1020 may detect each field of a same protocol type in the second flow table entry and the first flow table entry, where if data filled in fields of a same protocol type in the second flow table entry and the first flow table entry is the same, the same filled data is filled in the field of the same protocol type in the first flow table entry; or if data filled in fields of a same protocol type in the second flow table entry and the first flow table entry is different, the different filled data is filled in a field of the same protocol type in the third flow table entry. In this way, in the third flow table entry, filled data of fields that are of a same protocol type in the second flow table entry and the first flow table entry and that have same filled data, only one of the two pieces of filled data is filled in the field of the corresponding same protocol type in the third flow table entry. For filled data of fields that are of a same protocol type in the second flow table entry and the first flow table entry and that have different filled data, the different filled data is filled in the field of the corresponding same protocol type in the third flow table entry. In this way, it can be implemented to some degree that a data volume of the third flow table entry is less than a sum of a data volume of the second flow table entry and a data volume of the first flow table entry.

It can be understood that, functions of functional modules of the virtual layer device 1000 in this embodiment may be specifically implemented according to the method in the foregoing method embodiment. For specific implementation processes of the functions, reference may be made to the related description of the foregoing method embodiment, and details are no longer described herein.

It may be seen that, in this embodiment, for a first flow table entry carried in an OpenFlow protocol message sent by an SDN controller to an OpenFlow switch, a first field set in the first flow table entry carries an index of an actual value in the first field set, instead of carrying the actual value in the first field set. In a technical implementation, a data volume of an index of an actual value of a field is usually less than or even far less than that of the actual value of the field. Therefore, a mechanism of delivering a flow table entry in this embodiment helps reduce overheads of a control channel between the SDN controller and the OpenFlow switch, thereby reducing a congestion risk of the control channel, also helps reduce consumption of network resources of a switching device, and helps meet a requirement of complex networking. Moreover, the virtual layer device 1000 between the SDN controller and the OpenFlow switch may further combine several flow table entries. In this way, a data volume of transmitted flow table entries is further reduced.

Figure 11:
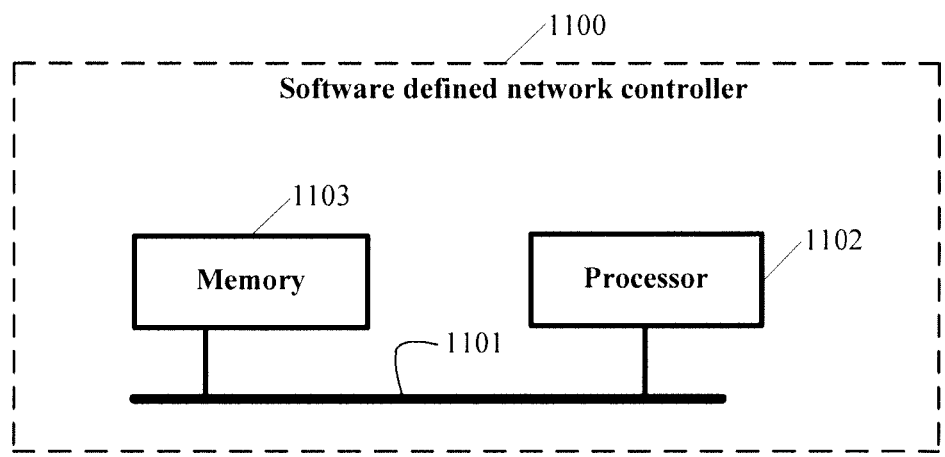
FIG. 11 is a schematic structural diagram of another SDN controller according to an embodiment of the present invention.

Referring to FIG. 11, FIG. 11 is a schematic diagram of a software defined network controller 1100 according to an embodiment of the present invention. The software defined network controller 1100 may include at least one bus 1101, at least one processor 1102 connected to the bus 1101, and at least one memory 1103 connected to the bus 1101.

The processor 1102 invokes, by using the bus 1101, code stored in the memory 1103 to generate a first flow table entry, where a first field set in the first flow table entry carries an index of an actual value in the first field set, the first field set includes N fields, and N is a positive integer; and send an OpenFlow protocol message to an OpenFlow switch, where the OpenFlow protocol message carries the first flow table entry.

The OpenFlow protocol message that carries the first flow table entry may be, for example, a flow modification (flow_mod) message or another OpenFlow protocol message.

It may be understood that, the first flow table entry may have a data structure that is the same as that of a standard flow table entry. For example, a type of a protocol field included in the first flow table entry and a location relationship between all types of protocol fields in the first flow table entry may be the same as those in the standard flow table entry. However, a type of information carried in some or all of the protocol fields in the first flow table entry is different from that in the standard flow table entry. Specifically, a field in the first field set in the first flow table entry carries an index of an actual value of the field, while each field in the standard flow table entry carries an actual value of the field.

N in the embodiments of the present invention may be, for example, equal to 1, 2, 5, 8, 10, or another value.

The N fields included in the first field set may be any N fields in the first flow table entry. The N fields included in the first field set may be adjacent N fields, partially adjacent N fields or nonadjacent N fields in the first flow table entry, that is, locations where fields in the first field set may be arbitrarily distributed in the first flow table entry, which helps more flexibly meet flexible requirements of various actual application scenarios. The N fields may, for example, include at least one of the following fields: a port number field, a source IP address field, a destination IP address field, a destination MAC address field, a virtual local area network identifier field, a source MAC address field, or the like. An actual value of a field in the first field set represents a standard value that the field should carry. For example, an actual value of the port number field is a port number, an actual value of the source IP address field is a source IP address, an actual value of the destination IP address field is a destination IP address, an actual value of the destination MAC address field is a destination MAC address, an actual value of the virtual local area network identifier field is a virtual local area network identifier, an actual value of the source MAC address field is a source MAC address, and an actual value of another field is deduced accordingly. In this embodiment of the present invention, a field in the first field set in the first flow table entry delivered by the software defined network controller 1100 does not carry an actual value of the field, but instead carries an index of the actual value of the field, where the index is information by using which the actual value of the field can be indexed. Assuming that the first field set includes a port number field, the port number field does not carry a port number, but instead carries an index by using which the port number can be indexed. For another example, the first field set includes a source IP address field, and the source IP address field does not carry a source IP address, but instead carries an index by using which the source IP address can be indexed. For another example, the first field set includes a destination IP address field, and the destination IP address field does not carry a destination IP address, but instead carries an index by using which the destination IP address can be indexed. For another example, the first field set includes a virtual local area network identifier field, and the virtual local area network identifier field does not carry a virtual local area network identifier, but instead carries an index by using which the virtual local area network identifier can be indexed. For another example, the first field set includes a destination MAC address field, and the destination MAC address field does not carry a destination MAC address, but instead carries an index by using which the destination MAC address can be indexed. For another example, the first field set includes a source MAC address field, and the source MAC address field does not carry a source MAC address, but instead carries an index by using which the source MAC address can be indexed. If the first field set further includes another protocol field, a related case is deduced accordingly.

It may be understood that, the index of the actual value may be of various types, and a requirement may be met as long as the OpenFlow switch can obtain the actual value according to the index of the actual value. In some implementation manners of the present invention, the index of the actual value may be, for example, a flow table entry identifier of a flow table entry stored in the OpenFlow switch, that is, an index carried in any field in the first field set in the first flow table entry carried in the OpenFlow protocol message may be a flow table entry identifier of a flow table entry stored in the OpenFlow switch. It may be understood that, if N is greater than 1, indexes carried in fields in the first field set may be completely the same, partially the same or completely different (for example, the indexes carried in the fields in the first field set may be specifically a same flow table entry identifier). It may be understood that, if an index of an actual value of a field is a flow table entry identifier of a flow table entry already stored in the OpenFlow switch, not only a manner of indexing to the actual value of the field by the OpenFlow switch may be greatly simplified, but also efficiency of indexing to the actual value of the field by the OpenFlow switch may be improved. Moreover, the flow table entry identifier usually has a relatively small data volume, which helps the software defined network controller 1100 to relatively desirably control a data volume of the delivered first flow table entry.

In some implementation manners of the present invention, each field in a second field set in the first flow table entry may further carry multiple actual values of the field. The second field set includes M fields, and M is a positive integer. Examples of the actual values of the fields are described above. It may be understood that, because each field in the second field set may further carry multiple actual values of the field, it equivalently indicates that the first flow table entry may be divided into multiple flow table entries, which also helps the software defined network controller 1100 to relatively desirably control a data volume of the delivered first flow table entry.

M in the embodiments of the present invention may be, for example, equal to 1, 2, 5, 8, 10, or another value.

The M fields included in the second field set in the first flow table entry may be any M fields that are in the first flow table entry and that are different from any field in the first field set. The M fields included in the second field set may be adjacent M fields, partially adjacent M fields or nonadjacent M fields in the first flow table entry. The M fields may include, for example, at least one of the following fields: a port number field, a source IP address field, a destination IP address field, a destination MAC address field, a virtual local area network identifier field, a source MAC address field, a protocol field, or the like.

An intersection of the second field set and the first field set is an empty set.

It can be understood that, functions of functional modules of the software defined network controller 1100 in this embodiment may be specifically implemented according to the method in the foregoing method embodiment. For specific implementation processes of the functions, reference may be made to the related description of the foregoing method embodiment, and details are no longer described herein.

It may be seen that, in the solution in this embodiment, for a first flow table entry carried in an OpenFlow protocol message sent by an SDN controller to an OpenFlow switch, a first field set in the first flow table entry carries an index of an actual value in the first field set, instead of carrying the actual value in the first field set. In a technical implementation, a data volume of an index of an actual value of a field is usually less than or even far less than that of the actual value of the field. Therefore, a mechanism of delivering a flow table entry in this embodiment helps reduce overheads of a control channel between the SDN controller and the OpenFlow switch, thereby reducing a congestion risk of the control channel, also helps reduce consumption of network resources of a switching device, and helps meet a requirement of complex networking.

Figure 12:
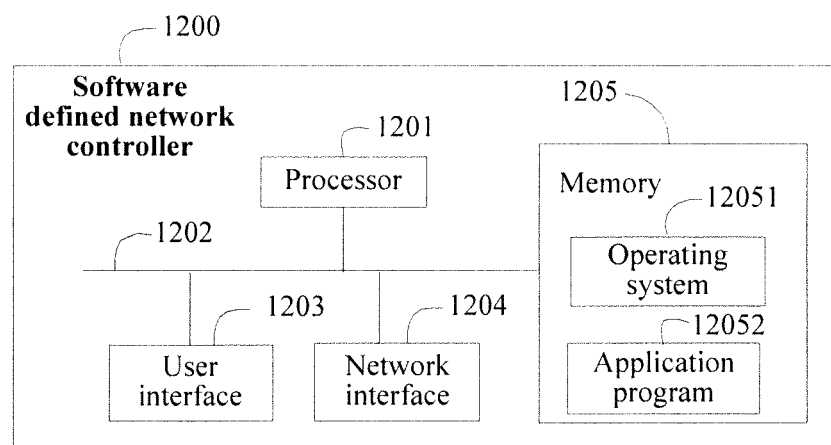
FIG. 12 is a schematic structural diagram of another SDN controller according to an embodiment of the present invention.

Referring to FIG. 12, FIG. 12 is a structural block diagram of a software defined network controller 1200 according to another embodiment of the present invention.

The software defined network controller 1200 may include: at least one processor 1201, at least one network interface 1204 or another user interface 1203, a memory 1205, and at least one communication bus 1202. The communication bus 1202 is configured to implement connection and communication between these components. The software defined network controller 1200 optionally includes the user interface 1203, which includes a display (for example, a touch screen, an LCD, a CRT, a holographic (Holographic) or a projector (Projector)), a click device (for example, a mouse, a trackball (trackball), a touch pad or a touch screen), and a camera and/or a sound pickup apparatus.

The memory 1202 may include, for example, a read only memory and a random access memory, and provide an instruction and data to the processor 1201.

A part in the memory 1202 further includes a non-volatile memory (NVRAM).

In some implementation manners, the memory 1205 stores the following elements, an executable module or a data structure, or a subset thereof, or an extended set thereof:

an operating system 12051, including various system programs, configured to implement various fundamental services and process hardware-based tasks; and an application program module 12052, including various application programs and used to implement various application services.

In this embodiment of the present invention, by invoking the programs or the instruction stored in the memory 1205, the processor 1201 generates a first flow table entry, where a first field set in the first flow table entry carries an index of an actual value in the first field set, the first field set includes N fields, and N is a positive integer; and sends an OpenFlow protocol message to an OpenFlow switch, where the OpenFlow protocol message carries the first flow table entry.

The OpenFlow protocol message that carries the first flow table entry may be, for example, a flow_mod message or another OpenFlow protocol message.

It may be understood that, the first flow table entry may have a data structure that is the same as that of a standard flow table entry. For example, a type of a protocol field included in the first flow table entry and a location relationship between all types of protocol fields in the first flow table entry may be the same as those in the standard flow table entry. However, a type of information carried in some or all of the protocol fields in the first flow table entry is different from that in the standard flow table entry. Specifically, a field in the first field set in the first flow table entry carries an index of an actual value of the field, while each field in the standard flow table entry carries an actual value of the field.

N in the embodiments of the present invention may be, for example, equal to 1, 2, 5, 8, 10, or another value.

The N fields included in the first field set may be any N fields in the first flow table entry. The N fields included in the first field set may be adjacent N fields, partially adjacent N fields or nonadjacent N fields in the first flow table entry, that is, locations where fields in the first field set may be arbitrarily distributed in the first flow table entry, which helps more flexibly meet flexible requirements of various actual application scenarios. The N fields may, for example, include at least one of the following fields: a port number field, a source IP address field, a destination IP address field, a destination MAC address field, a virtual local area network identifier field, a source MAC address field, or the like. An actual value of a field in the first field set represents a standard value that the field should carry. For example, an actual value of the port number field is a port number, an actual value of the source IP address field is a source IP address, an actual value of the destination IP address field is a destination IP address, an actual value of the destination MAC address field is a destination MAC address, an actual value of the virtual local area network identifier field is a virtual local area network identifier, an actual value of the source MAC address field is a source MAC address, and an actual value of another field is deduced accordingly. In this embodiment of the present invention, a field in the first field set in the first flow table entry delivered by the software defined network controller 1200 does not carry an actual value of the field, but instead carries an index of the actual value of the field, where the index is information by using which the actual value of the field can be indexed. Assuming that the first field set includes a port number field, the port number field does not carry a port number, but instead carries an index by using which the port number can be indexed. For another example, the first field set includes a source IP address field, and the source IP address field does not carry a source IP address, but instead carries an index by using which the source IP address can be indexed. For another example, the first field set includes a destination IP address field, and the destination IP address field does not carry a destination IP address, but instead carries an index by using which the destination IP address can be indexed. For another example, the first field set includes a virtual local area network identifier field, and the virtual local area network identifier field does not carry a virtual local area network identifier, but instead carries an index by using which the virtual local area network identifier can be indexed. For another example, the first field set includes a destination MAC address field, and the destination MAC address field does not carry a destination MAC address, but instead carries an index by using which the destination MAC address can be indexed. For another example, the first field set includes a source MAC address field, and the source MAC address field does not carry a source MAC address, but instead carries an index by using which the source MAC address can be indexed. If the first field set further includes another protocol field, a related case is deduced accordingly.

It may be understood that, the index of the actual value may be of various types, and a requirement may be met as long as the OpenFlow switch can obtain the actual value according to the index of the actual value. In some implementation manners of the present invention, the index of the actual value may be, for example, a flow table entry identifier of a flow table entry stored in the OpenFlow switch, that is, an index carried in any field in the first field set in the first flow table entry carried in the OpenFlow protocol message may be a flow table entry identifier of a flow table entry stored in the OpenFlow switch. It may be understood that, if N is greater than 1, indexes carried in fields in the first field set may be completely the same, partially the same or completely different (for example, the indexes carried in the fields in the first field set may be specifically a same flow table entry identifier). It may be understood that, if an index of an actual value of a field is a flow table entry identifier of a flow table entry already stored in the OpenFlow switch, not only a manner of indexing to the actual value of the field by the OpenFlow switch may be greatly simplified, but also efficiency of indexing to the actual value of the field by the OpenFlow switch may be improved. Moreover, the flow table entry identifier usually has a relatively small data volume, which helps the software defined network controller 1100 to relatively desirably control a data volume of the delivered first flow table entry.

In some implementation manners of the present invention, each field in a second field set in the first flow table entry may further carry multiple actual values of the field. The second field set includes M fields, and M is a positive integer. Examples of the actual values of the fields are described above. It may be understood that, because each field in the second field set may further carry multiple actual values of the field, it equivalently indicates that the first flow table entry may be divided into multiple flow table entries, which also helps the software defined network controller 1200 to relatively desirably control a data volume of the delivered first flow table entry.

M in the embodiments of the present invention may be, for example, equal to 1, 2, 5, 8, 10, or another value.

The M fields included in the second field set in the first flow table entry may be any M fields that are in the first flow table entry and that are different from any field in the first field set. The M fields included in the second field set may be adjacent M fields, partially adjacent M fields or nonadjacent M fields in the first flow table entry. The M fields may include, for example, at least one of the following fields: a port number field, a source IP address field, a destination IP address field, a destination MAC address field, a virtual local area network identifier field, a source MAC address field, a protocol field, or the like.

An intersection of the second field set and the first field set is an empty set.

It can be understood that, functions of functional modules of the software defined network controller 1200 in this embodiment may be specifically implemented according to the method in the foregoing method embodiment. For specific implementation processes of the functions, reference may be made to the related description of the foregoing method embodiment, and details are no longer described herein.

Figure 13:
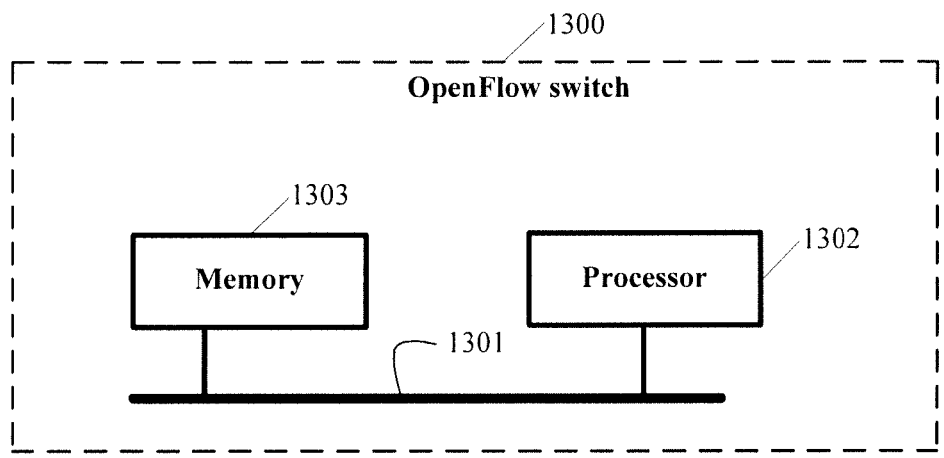
FIG. 13 is a schematic structural diagram of another OpenFlow switch according to an embodiment of the present invention.

Referring to FIG. 13, FIG. 13 is a schematic diagram of an OpenFlow switch 1300 according to an embodiment of the present invention. The OpenFlow switch 1300 may include at least one bus 1301, at least one processor 1302 connected to the bus 1301, and at least one memory 1303 connected to the bus 1301.

The processor 1302 invokes, by using the bus 1301, code stored in the memory 1303 to receive an OpenFlow protocol message carrying a first flow table entry, where a first field set in the first flow table entry may carry an index of an actual value in the first field set, the first field set includes N fields, and N is a positive integer; obtain the actual value in the first field set based on the index of the actual value in the first field set; and replace, with the actual value in the first field set, the index that is of the actual value in the first field set and that is carried in the first field set in the first flow table entry.

The OpenFlow protocol message that carries the first flow table entry may be, for example, a flow_mod message or another OpenFlow protocol message.

The N fields included in the first field set may be any N fields in the first flow table entry. The N fields included in the first field set may be adjacent N fields, partially adjacent N fields or nonadjacent N fields in the first flow table entry. The N fields may, for example, include at least one of the following fields: a port number field, a source IP address field, a destination IP address field, a destination MAC address field, a virtual local area network identifier field, a source MAC address field, a protocol field, or the like.

If the index is a flow table entry identifier of a flow table entry already stored in the OpenFlow switch, the obtaining the actual value in the first field set based on the index of the actual value in the first field set may include: obtaining, based on the flow table entry identifier, an actual value filled in a third field set that is in the flow table entry represented by the flow table entry identifier and that has a same protocol type as the first field set, where fields that are in the third field set and the first field set and that have a same protocol type have a same actual value. It may be understood that, the third field set and the first field set have equal quantities of fields, and protocol types of the fields included in the third field set and the first field set are in one-to-one correspondences.

Further, the memory 1303 may further store the first flow table entry obtained after an index that is of an actual value of the first field set and that is carried in the first field set is replaced with the actual value of the first field set, that is, store the first flow table entry obtained after the obtained actual value is filled in the first field set.

In some embodiments of the present invention, the processor 1302 may further send the stored first flow table entry or an identifier of the first flow table entry to an SDN controller, to facilitate synchronization of the stored flow table entry between the OpenFlow switch and the SDN controller.

In some embodiments of the present invention, the processor 1302 may be further configured to: before the first flow table entry is received, send a first packet or a packet header of a first packet to the SDN controller. An Instructions field of the first flow table entry carries a routing instruction set used to process the first packet or an index of a routing instruction set. The processor 1302 may be further configured to process the first packet based on the routing instruction set.

It can be understood that, functions of functional modules of the OpenFlow switch 1300 in this embodiment may be specifically implemented according to the method in the foregoing method embodiment. For specific implementation processes of the functions, reference may be made to the related description of the foregoing method embodiment, and details are no longer described herein.

It may be seen that, in this embodiment, for a first flow table entry carried in an OpenFlow protocol message sent by the SDN controller to the OpenFlow switch 1300, because a first field set in the first flow table entry carries an index of an actual value in the first field set, instead of carrying the actual value in the first field set. In a technical implementation, a data volume of an index of an actual value of a field is usually less than or even far less than that of the actual value of the field. Therefore, a mechanism of delivering a flow table entry in this embodiment helps reduce overheads of a control channel between the SDN controller and the OpenFlow switch, thereby reducing a congestion risk of the control channel, also helps reduce consumption of network resources of a switching device, and helps meet a requirement of complex networking.

Figure 14:
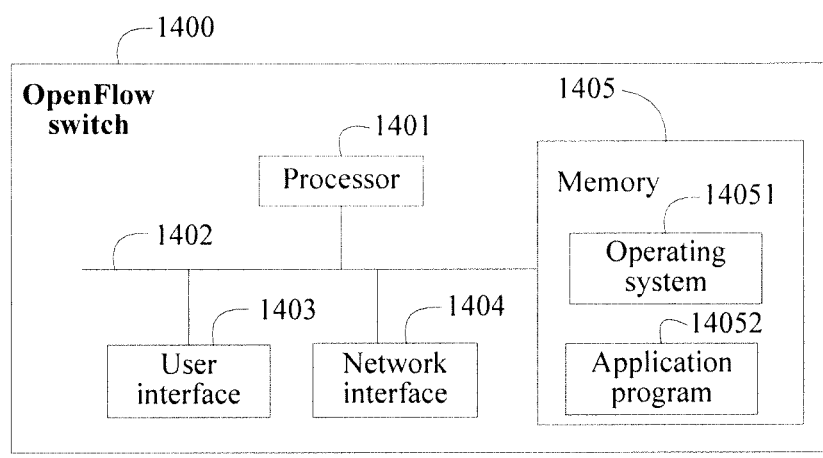
FIG. 14 is a schematic structural diagram of another OpenFlow switch according to an embodiment of the present invention.

Referring to FIG. 14, FIG. 14 is a structural block diagram of an OpenFlow switch 1400 according to another embodiment of the present invention.

The OpenFlow switch 1400 may include: at least one processor 1401, at least one network interface 1404 or another user interface 1403, a memory 1405, and at least one communication bus 1402. The communication bus 1402 is configured to implement connection and communication between these components. The OpenFlow switch 1400 optionally includes the user interface 1403, which includes a display (for example, a touch screen, an LCD, a CRT, a holographic or a projector), a click device (for example, a mouse, a trackball, a touch pad or a touch screen), and a camera and/or a sound pickup apparatus, and the like.

The memory 1402 may include, for example, a read only memory and a random access memory, and provide an instruction and data to the processor 1401.

A part in the memory 1402 further includes a non-volatile memory (NVRAM).

In some implementation manners, the memory 1405 stores the following elements, an executable module or a data structure, or a subset thereof, or an extended set thereof:

an operating system 14051, including various system programs, configured to implement various fundamental services and process hardware-based tasks; and an application program module 14052, including various application programs and used to implement various application services.

In this embodiment of the present invention, by invoking the programs or the instruction memory 1405 stored in the memory 1405, the processor 1401 receives an OpenFlow protocol message carrying a first flow table entry, where a first field set in the first flow table entry may carry an index of an actual value in the first field set, the first field set includes N fields, and N is a positive integer; obtain the actual value in the first field set based on the index of the actual value in the first field set; and replace, with the actual value in the first field set, the index that is of the actual value in the first field set and that is carried in the first field set in the first flow table entry.

The OpenFlow protocol message that carries the first flow table entry may be, for example, a flow_mod message or another OpenFlow protocol message.

The N fields included in the first field set may be any N fields in the first flow table entry. The N fields included in the first field set may be adjacent N fields, partially adjacent N fields or nonadjacent N fields in the first flow table entry. The N fields may, for example, include at least one of the following fields: a port number field, a source IP address field, a destination IP address field, a destination MAC address field, a virtual local area network identifier field, a source MAC address field, a protocol field, or the like.

If the index is a flow table entry identifier of a flow table entry already stored in the OpenFlow switch, the obtaining the actual value in the first field set based on the index of the actual value in the first field set may include: obtaining, based on the flow table entry identifier, an actual value filled in a third field set that is in the flow table entry represented by the flow table entry identifier and that has a same protocol type as the first field set, where fields that are in the third field set and the first field set and that have a same protocol type have a same actual value. It may be understood that, the third field set and the first field set have equal quantities of fields, and protocol types of the fields included in the third field set and the first field set are in one-to-one correspondences.

Further, the memory 1402 may further store the first flow table entry obtained after an index that is of an actual value of the first field set and that is carried in the first field set is replaced with the actual value of the first field set, that is, store the first flow table entry obtained after the obtained actual value is filled in the first field set.

In some embodiments of the present invention, the processor 1401 may further send the stored first flow table entry or an identifier of the first flow table entry to an SDN controller, to facilitate synchronization of the stored flow table entry between the OpenFlow switch and the SDN controller.

In some embodiments of the present invention, the processor 1401 may be further configured to: before the first flow table entry is received, send a first packet or a packet header of a first packet to the SDN controller. An Instructions field of the first flow table entry carries a routing instruction set used to process the first packet or an index of a routing instruction set. The processor 1401 may be further configured to process the first packet based on the routing instruction set.

It can be understood that, functions of functional modules of the OpenFlow switch 1400 in this embodiment may be specifically implemented according to the method in the foregoing method embodiment. For specific implementation processes of the functions, reference may be made to the related description of the foregoing method embodiment, and details are no longer described herein.

Figure 15:
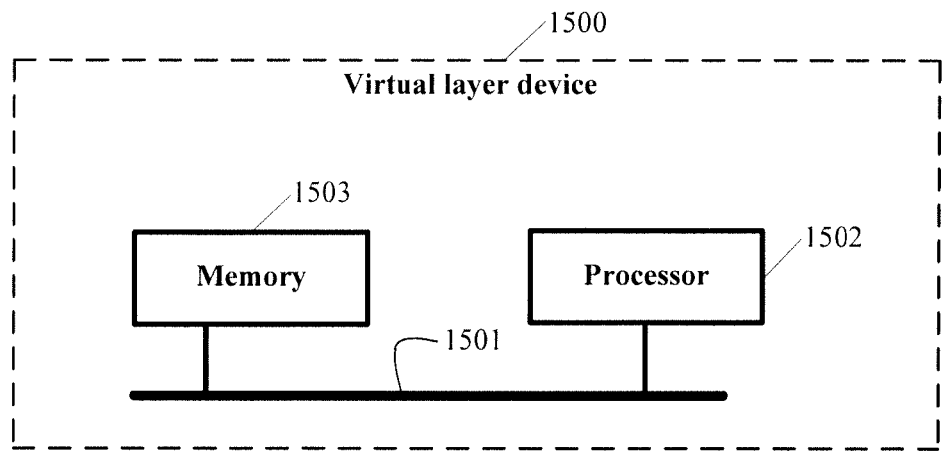
FIG. 15 is a schematic structural diagram of another virtual layer device according to an embodiment of the present invention.

Referring to FIG. 15, FIG. 15 is a schematic diagram of a virtual layer device 1500 according to an embodiment of the present invention. The virtual layer device 1500 may include at least one bus 1501, at least one processor 1502 connected to the bus 1501, and at least one memory 1503 connected to the bus 1501.

The processor 1502 invokes, by using the bus 1501, code stored in the memory 1503 to receive a first OpenFlow protocol message from a first SDN controller, where the first OpenFlow protocol message carries a first flow table entry, and a first field in the first flow table entry carries an index of an actual value in the first field; receive a second OpenFlow OpenFlow protocol message from a second SDN controller, where the second OpenFlow protocol message carries a second flow table entry, and a fourth field in the second flow table entry carries an index of an actual value in the fourth field; combine the first flow table entry and the second flow table entry into a third flow table entry; and send a third OpenFlow protocol message carrying the third flow table entry to an OpenFlow switch.

The so-called combining multiple flow table entries mainly refers to combining data filled in fields of a same protocol type in the multiple flow table entries. For example, assuming that the second flow table entry and the second flow table entry both include: a port number field, a source IP address field, a destination IP address field, a destination MAC address field, a virtual local area network identifier field, a source MAC address field, and a field of another protocol type, the virtual layer device may combine data filled in the port number fields of the second flow table entry and the first flow table entry, combine data filled in the source IP address fields of the second flow table entry and the first flow table entry, combine data filled in the destination MAC address fields of the second flow table entry and the first flow table entry, combine data filled in the destination IP address fields of the first flow table entry and the second flow table entry, combine data filled in the virtual local area network identifier fields of the second flow table entry and the first flow table entry, and/or combine data filled in the source MAC address fields of the first flow table entry and the second flow table entry, and a manner of combining data filled in fields of another protocol type may be deduced accordingly.

It can be understood that, functions of functional modules of the virtual layer device 1500 in this embodiment may be specifically implemented according to the method in the foregoing method embodiment. For specific implementation processes of the functions, reference may be made to the related description of the foregoing method embodiment, and details are no longer described herein.

It may be seen that, in this embodiment, for a first flow table entry carried in an OpenFlow protocol message sent by an SDN controller to an OpenFlow switch, a first field set in the first flow table entry carries an index of an actual value in the first field set, instead of carrying the actual value in the first field set. In a technical implementation, a data volume of an index of an actual value of a field is usually less than or even far less than that of the actual value of the field. Therefore, a mechanism of delivering a flow table entry in this embodiment helps reduce overheads of a control channel between the SDN controller and the OpenFlow switch, thereby reducing a congestion risk of the control channel, also helps reduce consumption of network resources of a switching device, and helps meet a requirement of complex networking. Moreover, the virtual layer device 1500 between the SDN controller and the OpenFlow switch may further combine several flow table entries. In this way, a data volume of transmitted flow table entries is further reduced.

Figure 16:
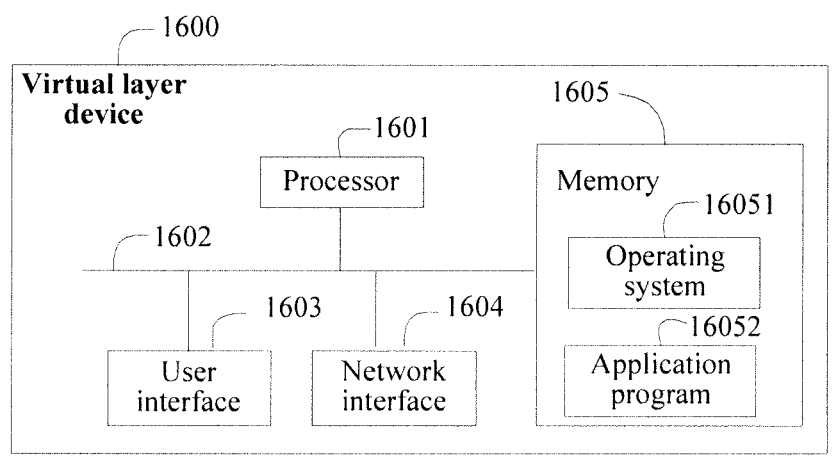
FIG. 16 is a schematic structural diagram of another virtual layer device according to an embodiment of the present invention.

Referring to FIG. 16, FIG. 16 is a structural block diagram of a virtual layer device 1600 according to another embodiment of the present invention.

The virtual layer device 1600 may include: at least one processor 1601, at least one network interface 1604 or another user interface 1603, a memory 1605, and at least one communication bus 1602. The communication bus 1602 is configured to implement connection and communication between these components. The virtual layer device 1600 optionally includes the user interface 1603, which includes a display (the display is, for example, a touch screen, an LCD, a CRT, a holographic or a projector), a click device (for example, a mouse, a trackball, a touch pad or a touch screen), and a camera and/or a sound pickup apparatus, and the like.

The memory 1602 may include, for example, a read only memory and a random access memory, and provide an instruction and data to the processor 1601.

A part in the memory 1602 further includes a non-volatile memory (NVRAM).

In some implementation manners, the storage 1605 stores the following elements, an executable module or a data structure, or a subset thereof, or an extended set thereof:

an operating system 16051, including various system programs, configured to implement various fundamental services and process hardware-based tasks; and an application program module 16052, including various application programs and used to implement various application services.

In this embodiment of the present invention, by invoking the programs or the instruction stored in the memory 1605, the processor 1601 receives a first OpenFlow protocol message from a first SDN controller, where the first OpenFlow protocol message carries a first flow table entry, and a first field in the first flow table entry carries an index of an actual value of the first field; receives a second OpenFlow OpenFlow protocol message from a second SDN controller, where the second OpenFlow protocol message carries a second flow table entry, and a fourth field in the second flow table entry carries an index of an actual value in the fourth field; combines the first flow table entry and the second flow table entry into a third flow table entry; and sends a third OpenFlow protocol message carrying the third flow table entry to an OpenFlow switch.

The so-called combining multiple flow table entries mainly refers to combining data filled in fields of a same protocol type in the multiple flow table entries. For example, assuming that the second flow table entry and the second flow table entry both include: a port number field, a source IP address field, a destination IP address field, a destination MAC address field, a virtual local area network identifier field, a source MAC address field, and a field of another protocol type, the virtual layer device may combine data filled in the port number fields of the second flow table entry and the first flow table entry, combine data filled in the source IP address fields of the second flow table entry and the first flow table entry, combine data filled in the destination MAC address fields of the second flow table entry and the first flow table entry, combine data filled in the destination IP address fields of the first flow table entry and the second flow table entry, combine data filled in the virtual local area network identifier fields of the second flow table entry and the first flow table entry, and/or combine data filled in the source MAC address fields of the first flow table entry and the second flow table entry, and a manner of combining data filled in fields of another protocol type may be deduced accordingly.

It can be understood that, functions of functional modules of the virtual layer device 1600 in this embodiment may be specifically implemented according to the method in the foregoing method embodiment. For specific implementation processes of the functions, reference may be made to the related description of the foregoing method embodiment, and details are no longer described herein.

Figure 17:
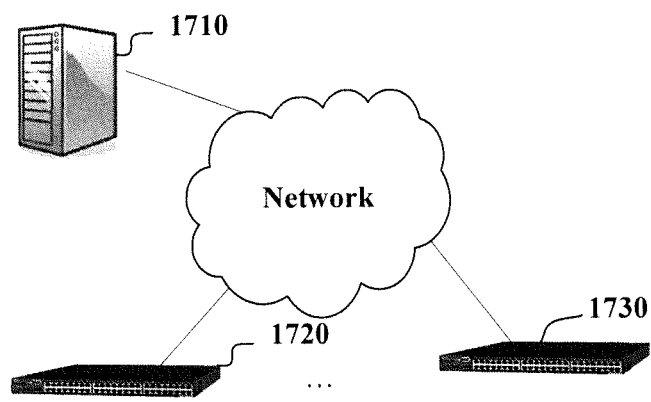
FIG. 17 is a schematic diagram of a communications system according to an embodiment of the present invention.

Referring to FIG. 17, an embodiment of the present invention further provides a communications system, which may include: a software defined network controller 1710 and an OpenFlow switch 1720.

The software defined network controller 1710 is configured to generate a first flow table entry, where a first field set in the first flow table entry carries an index of an actual value in the first field set, the first field set includes N fields, and N is a positive integer; and send an OpenFlow protocol message to the OpenFlow switch, where the OpenFlow protocol message carries the first flow table entry.

The OpenFlow switch 1720 is configured to receive the OpenFlow protocol message; obtain the actual value in the first field set based on the index of the actual value in the first field set; and replace, with the actual value in the first field set, the index that is of the actual value in the first field set and that is carried in the first field set in the first flow table entry.

It can be understood that, the software defined network controller 1710 in this embodiment may have some or all of the software defined network controllers described in the foregoing embodiment. The OpenFlow switch 1720 may have some or all of the OpenFlow switches described in the foregoing embodiment. Functions of the the software defined network controller 1710 and the OpenFlow switch 1720 may be specifically implemented according to the method in the foregoing method embodiment. For specific implementation processes of the functions, reference may be made to the related description of the foregoing method embodiment, and details are no longer described herein.

Further, the communications system may further include another OpenFlow switch 1730.

It may be seen that, in this embodiment, for a first flow table entry carried in an OpenFlow protocol message sent by the software defined network controller 1710 to the OpenFlow switch 1720, because a first field set in the first flow table entry carries an index of an actual value in the first field set, instead of carrying the actual value in the first field set. In a technical implementation, a data volume of an index of an actual value of a field is usually less than or even far less than that of the actual value of the field. Therefore, a mechanism of delivering a flow table entry in this embodiment helps reduce overheads of a control channel between the software defined network controller 1710 and the OpenFlow switch, thereby reducing a congestion risk of the control channel, also helps reduce consumption of network resources of the OpenFlow switch, and helps meet a requirement of complex networking.

Figure 18:
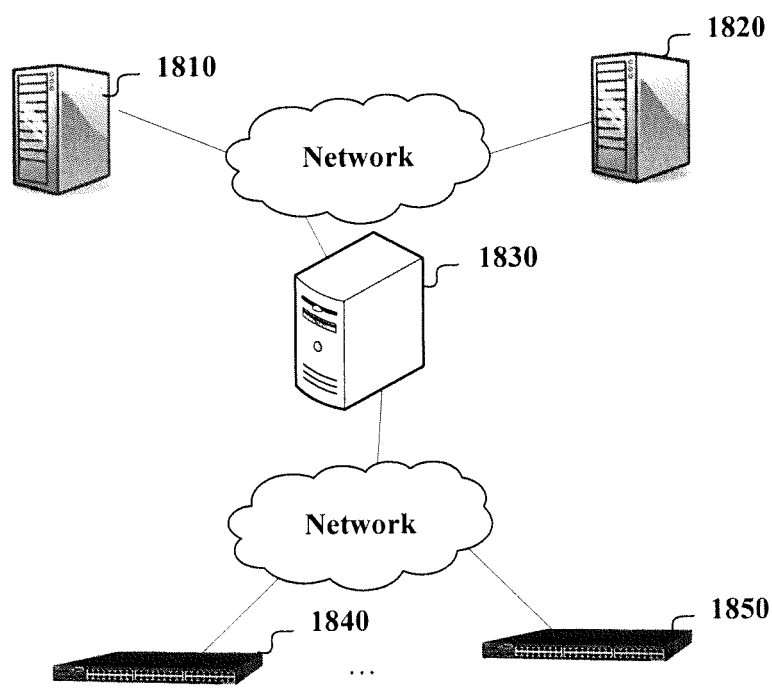
FIG. 18 is a schematic diagram of another communications system according to an embodiment of the present invention.

Referring to FIG. 18, an embodiment of the present invention further provides another communications system, which may include: a first software defined network controller 1810, a second software defined network controller 1820, a virtual layer device 1830, and an OpenFlow switch 1840.

The first software defined network controller 1810 is configured to send a first OpenFlow OpenFlow protocol message, where the first OpenFlow protocol message carries a first flow table entry, and a first field in the first flow table entry carries an index of an actual value in the first field.

The second software defined network controller 1820 is configured to send a second OpenFlow protocol message, where the second OpenFlow protocol message carries a second flow table entry, and a fourth field in the second flow table entry carries an index of an actual value in the fourth field.

The virtual layer device 1830 is configured to receive the first OpenFlow protocol message from the first software defined network controller 1810; receive the second OpenFlow protocol message from the second software defined network controller 1820; combine the first flow table entry and the second flow table entry into a third flow table entry; and send a third OpenFlow protocol message carrying the third flow table entry to the OpenFlow switch.

The OpenFlow switch 1840 is configured to receive the third OpenFlow protocol message; divide the third flow table entry carried in the third OpenFlow protocol message into the first flow table entry and the second flow table entry; obtain the actual value of the first field based on the index of the actual value of the first field; obtain the actual value of the fourth field based on the index of the actual value of the fourth field; replace the index, of the actual value in the first field, carried in the first field in the first flow table entry with the actual value in the first field; and replace the index, of the actual value of the fourth field, carried in the fourth field in the second flow table entry with the actual value of the fourth field.

It can be understood that, the software defined network controller in this embodiment may have some or all of the software defined network controllers described in the foregoing embodiment. The OpenFlow switch 1840 may have some or all of the OpenFlow switches described in the foregoing embodiment. The virtual layer device 1830 may have some or all of the virtual layer devices described in the foregoing embodiment. Functions of the software defined network controller, the OpenFlow switch 1840, and the virtual layer device 1830 may be specifically implemented according to the method in the foregoing method embodiment. For specific implementation processes of the functions, reference may be made to the related description of the foregoing method embodiment, and details are no longer described herein.

Further, the communications system may further include another OpenFlow switch 1850.

It may be seen that, in this embodiment, for a first flow table entry carried in an OpenFlow protocol message sent by an SDN controller to an OpenFlow switch, a first field set in the first flow table entry carries an index of an actual value in the first field set, instead of carrying the actual value in the first field set. In a technical implementation, a data volume of an index of an actual value of a field is usually less than or even far less than that of the actual value of the field. Therefore, a mechanism of delivering a flow table entry in this embodiment helps reduce overheads of a control channel between the SDN controller and the OpenFlow switch, thereby reducing a congestion risk of the control channel, also helps reduce consumption of network resources of a switching device, and helps meet a requirement of complex networking. Moreover, the virtual layer device between the SDN controller and the OpenFlow switch may further combine several flow table entries. In this way, a data volume of transmitted flow table entries is further reduced.

It should be noted that, to make the description brief, the foregoing method embodiments are expressed as a series of actions. However, a person skilled in the art should appreciate that the present invention is not limited to the described action sequence, because according to the present invention, some steps may be performed in other sequences or performed simultaneously. In addition, a person skilled in the art should also appreciate that all the embodiments described in the specification are exemplary embodiments, and the related actions and modules are not necessarily mandatory to the present invention.

In the foregoing embodiments, the description of each embodiment has respective focuses. For a part that is not described in detail in an embodiment, reference may be made to related descriptions in other embodiments.

In the several embodiments provided in the present application, it should be understood that the disclosed apparatus may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one location, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a read-only memory (ROM, Read-Only Memory), a random access memory (RAM, Random Access Memory), a removable hard disk, a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A flow table management method, comprising:
generating, by a software defined network controller, a first flow table entry, wherein a first field set in the first flow table entry carries an index of an actual value in the first field set without carrying the actual value in the first field set, the first field set comprises N fields, N is a positive integer, and the index is a flow table entry identifier of a flow table entry stored in an OpenFlow switch; and
sending, by the software defined network controller, an OpenFlow protocol message to the OpenFlow switch, wherein the OpenFlow protocol message carries the first flow table entry to be used by the OpenFlow switch to obtain the actual value in the first field set.

2. The method according to claim 1, wherein
the OpenFlow switch is to obtain the actual value in the first field set filled in a third field set in the flow table entry which corresponds to the flow table entry identifier carried in the first flow table entry, and
the third field set has a same protocol type as the first field set, and fields that are in the first field set and the third field set and that have a same protocol type have a same actual value.

3. The method according to claim 1, wherein
each field in a second field set in the first flow table entry carries multiple actual values, and
the second field set comprises M fields, and M is a positive integer.

4. The method according to claim 1, further comprising:
before the generating a first flow table entry, receiving, by the software defined network controller, a first packet or a packet header of a first packet from a switch, and determining, according to a preset processing policy, a routing instruction set used to process the first packet, wherein an instruction field of the first flow table entry carries the routing instruction set or an index of the routing instruction set.

5. A flow table management method, comprising:
receiving, by an OpenFlow switch, an OpenFlow protocol message, wherein the OpenFlow protocol message carries a first flow table entry, a first field set in the first flow table entry carries an index of an actual value in the first field set, the first field set comprises N fields, N is a positive integer, and the index is a flow table entry identifier of a flow table entry stored in the switch;
obtaining, by the OpenFlow switch, the actual value in the first field set based on the flow table entry identifier, by obtaining an actual value from the flow table entry represented by the flow table entry identifier; and
replacing, by the OpenFlow switch with the actual value in the first field set, the index that is of the actual value in the first field set and that is carried in the first field set in the first flow table entry.

6. The method according to claim 5, wherein the obtaining the actual value in the first field set comprises: obtaining, based on the flow table entry identifier, an actual value filled in a third field set that is in the flow table entry represented by the flow table entry identifier and that has a same protocol type as the first field set, wherein fields that are in the third field set and the first field set and that have a same protocol type have a same actual value, and
the method further comprises:
after replacing the index, storing the first flow table entry.

7. The method according to claim 6, further comprising:
sending, by the OpenFlow switch, the stored first flow table entry or the first flow table entry identifier to a software defined network controller.

8. The method according to claim 5, further comprising:
before the OpenFlow switch receives the first flow table entry,
sending, by the OpenFlow switch, a first packet or a packet header of a first packet to a software defined network controller, wherein an instruction field of the first flow table entry carries a routing instruction set used to process the first packet or an index of a routing instruction set; and
processing, by the OpenFlow switch, the first packet based on the routing instruction set.

9. A flow table relay method, comprising:
receiving, by a virtual layer device, a first OpenFlow protocol message from a first software defined network controller, wherein the first OpenFlow protocol message carries a first flow table entry, and a first field in the first flow table entry carries an index of an actual value in the first field;

receiving, by the virtual layer device, a second OpenFlow protocol message from a second software defined network controller, wherein the second OpenFlow protocol message carries a second flow table entry, and a fourth field in the second flow table entry carries an index of an actual value in the fourth field;

combining, by the virtual layer device, the first flow table entry and the second flow table entry into a third flow table entry; and sending, by the virtual layer device, a third OpenFlow protocol message carrying the third flow table entry to an OpenFlow switch.

10. A software defined network controller, comprising:

at least one memory; and at least one processor configured to execute one or more programs or instructions stored in the at least one memory to:

generate a first flow table entry, wherein a first field set in the first flow table entry carries an index of an actual value in the first field set, the first field set comprises N fields, and N is a positive integer and the index is a flow table entry identifier of a flow table entry stored in an OpenFlow switch, and send an OpenFlow protocol message to the Open Flow switch, wherein the OpenFlow protocol message carries the first flow table entry to be used by the OpenFlow switch to obtain the actual value in the first field set.

11. The software defined network controller according to claim 10, wherein the OpenFlow switch is to obtain the actual value in the first field set filled in a third field set in the flow table entry which corresponds to the flow table entry identifier carried in the first flow table entry, and the third field set has a same protocol type as the first field set, and fields that are in the first field set and the third field set and that have a same protocol type have a same actual value.

12. The software defined network controller according to claim 10, wherein each field in a second field set in the first flow table entry carries multiple actual values, and the second field set comprises M fields, and M is a positive integer.

13. The software defined network controller according to claim 10, wherein the at least one processor is further configured to, before the first flow table entry is generated, receive a first packet or a packet header of a first packet from a switch, and determine, according to a preset processing policy, a routing instruction set used to process the first packet, and an instruction field of the first flow table entry carries the routing instruction set or an index of the routing instruction set.

14. An OpenFlow switch, comprising:

at least one memory; and at least one processor configured to execute one or more programs or instructions stored in the at least one memory to:

receive an OpenFlow protocol message, wherein the OpenFlow protocol message carries a first flow table entry, a first field set in the first flow table entry carries an index of an actual value in the first field set, the first field set comprises N fields, N is a positive integer, and the index is a flow table entry identifier of a flow table entry stored in the switch, obtain the actual value in the first field set based on the flow table entry identifier by obtaining an actual value from the flow table entry represented by the flow table entry identifier, and replace, with the obtained actual value of the first field set, the index that is of the actual value in the first field set and that is carried in the first field set in the first flow table entry.

15. The OpenFlow switch according to claim 14, wherein the at least one processor is configured to obtain, based on the flow table entry identifier, an actual value filled in a third field set that is in the flow table entry represented by the flow table entry identifier and that has a same protocol type as the first field set, wherein fields that are in the third field set and the first field set and that have a same protocol type have a same actual value, and the at least one processor is configured to, after replacing the index, store the first flow table entry in the at least one memory.

16. The OpenFlow switch according to claim 15, wherein the at least one processor is further configured to send the stored first flow table entry or the first flow table entry identifier to a software defined network controller.

17. The OpenFlow switch according to claim 14, wherein the at least one processor is further configured to, before the first flow table entry is received, send a first packet or a packet header of a first packet to a software defined network controller, an instruction field of the first flow table entry carries a routing instruction set used to process the first packet or an index of a routing instruction set, and the at least one processor is further configured to process the first packet based on the routing instruction set.

18. A virtual layer device, comprising:

at least one memory; and at least one processor configured to execute one or more programs or instructions stored in the at least one memory to:

receive a first OpenFlow protocol message from a first software defined network controller, wherein the first OpenFlow protocol message carries a first flow table entry, and a first field in the first flow table entry carries an index of an actual value in the first field; and receive a second OpenFlow protocol message from a second software defined network controller, wherein the second OpenFlow protocol message carries a second flow table entry, and a fourth field in the second flow table entry carries an index of an actual value in the fourth field, combine the first flow table entry and the second flow table entry into a third flow table entry, and send a third OpenFlow protocol message carrying the third flow table entry to an OpenFlow switch.

* * * * *

UNITED STATES PATENT AND TRADEMARK OFFICE
CERTIFICATE OF CORRECTION

PATENT NO. : 10,243,833 B2
APPLICATION NO. : 15/360129
DATED : March 26, 2019
INVENTOR(S) : Pengcheng Tang et al.

It is certified that error appears in the above-identified patent and that said Letters Patent is hereby corrected as shown below:

In the Claims

Column 49, Line 24, In Claim 10, after "N fields," delete "and".

Column 49, Line 27, In Claim 10, delete "Open Flow" and insert -- OpenFlow --, therefor.

Signed and Sealed this
Twelfth Day of November, 2019

Andrei Iancu
*Director of the United States Patent and Trademark Office*